United States Patent
Huang

(10) Patent No.: US 11,686,122 B2
(45) Date of Patent: Jun. 27, 2023

(54) TRANSMISSION MECHANISM AND LOCK

(71) Applicant: TAIWAN FU HSING INDUSTRIAL CO., LTD., Kaohsiung (TW)

(72) Inventor: Chao-Ming Huang, Kaohsiung (TW)

(73) Assignee: TAIWAN FU HSING INDUSTRIAL CO., LTD., Kaohsiung (TW)

(*) Notice: Subject to any disclaimer, the term of this patent is extended or adjusted under 35 U.S.C. 154(b) by 371 days.

(21) Appl. No.: 17/113,118

(22) Filed: Dec. 7, 2020

(65) Prior Publication Data
US 2022/0064990 A1 Mar. 3, 2022

(30) Foreign Application Priority Data
Aug. 27, 2020 (TW) .................... 109211167

(51) Int. Cl.
| | |
|---|---|
| *E05B 13/10* | (2006.01) |
| *E05B 3/06* | (2006.01) |
| *F16H 25/18* | (2006.01) |
| *E05B 13/00* | (2006.01) |
| *E05B 63/00* | (2006.01) |

(Continued)

(52) U.S. Cl.
CPC ............ *E05B 13/108* (2013.01); *E05B 3/065* (2013.01); *E05B 13/004* (2013.01); *E05B 13/105* (2013.01); *E05B 63/0069* (2013.01); *F16H 25/18* (2013.01); *E05B 1/003* (2013.01); *E05B 27/00* (2013.01); *E05Y 2201/474* (2013.01); *E05Y 2201/638* (2013.01); *E05Y 2201/686* (2013.01); *E05Y 2900/132* (2013.01)

(58) Field of Classification Search
CPC ........ E05B 1/003; E05B 1/0038; E05B 3/065; E05B 13/002; E05B 13/004; E05B 13/005; E05B 13/007; E05B 13/10; E05B 13/101; E05B 13/105; E05B 13/108; E05B 27/00; E05B 55/12; E05B 63/0069; F16H 25/18; E05Y 2201/474; E05Y 2201/638; E05Y 2201/686; E05Y 2900/132
See application file for complete search history.

(56) References Cited

U.S. PATENT DOCUMENTS

| | | | | |
|---|---|---|---|---|
| 5,784,909 | A | * | 7/1998 | Huang ................. E05B 55/005 292/357 |
| 5,927,777 | A | * | 7/1999 | Kuo ..................... E05B 55/005 292/358 |

(Continued)

*Primary Examiner* — Christopher J Boswell
(74) *Attorney, Agent, or Firm* — Winston Hsu

(57) ABSTRACT

A transmission mechanism applied to a lock and for controlling the lock to switch between an unlocked state and a locked state. The lock includes a first handle set including a first cover plate which includes a first fitting portion. The transmission mechanism includes a transmission element and a moving component. The transmission element is connected to the first handle set in a manner that the transmission element is incapable of moving along a rotating axis and has an abutting portion. The moving component is disposed on the transmission element in a manner that the moving component is capable of moving along the rotating axis and includes a first engaging groove, a second engaging groove and a second fitting portion. When the transmission element is operated to rotate, the abutting portion is capable of switching between the first engaging groove and the second engaging groove.

9 Claims, 20 Drawing Sheets

(51) Int. Cl.
*E05B 1/00* (2006.01)
*E05B 27/00* (2006.01)

(56) References Cited

U.S. PATENT DOCUMENTS

| | | | | |
|---|---|---|---|---|
| 6,807,833 B1* | 10/2004 | Huang | ............ | E05B 13/101 |
| | | | | 70/217 |
| 8,256,253 B2* | 9/2012 | Chen | ............ | E05B 13/101 |
| | | | | 70/222 |
| 8,479,544 B2* | 7/2013 | Liu | ............ | E05B 55/005 |
| | | | | 292/336.3 |
| 8,813,530 B2* | 8/2014 | Chiou | ............ | E05B 55/005 |
| | | | | 292/336.3 |
| 2005/0223763 A1* | 10/2005 | Huang | ............ | E05B 3/065 |
| | | | | 70/224 |
| 2006/0086162 A1* | 4/2006 | Huang | ............ | E05B 9/084 |
| | | | | 70/371 |
| 2006/0156770 A1* | 7/2006 | Huang | ............ | E05B 3/065 |
| | | | | 70/224 |

* cited by examiner

TRANSMISSION MECHANISM AND LOCK

BACKGROUND OF THE INVENTION

1. Field of the Invention

The present disclosure relates to a transmission mechanism and a lock, and more particularly, to a transmission mechanism incapable of moving along the rotating axis when being operated to rotate and a lock having the same.

2. Description of the Prior Art

Please refer to FIG. 1, which is an exploded diagram showing a lock 1 of prior art. The lock 1 defines a rotating axis X and is for being installed on a door (not shown). The lock 1 includes a first handle set 2, a second handle set 3 and a transmission mechanism (not labelled). The transmission mechanism includes a transmission element 4, a moving component 5, a transmission cam 6 and a tubular connecting element 7. The first handle set 2 includes a first cover plate 21 fixedly disposed on the door. The first cover plate 21 includes two first fitting portions 22 (only one is shown) which are disposed symmetrically. The transmission element 4 includes two abutting portions 41. The moving component 5 includes two first bottom grooves 51 which are disposed symmetrically, two second bottom grooves 52 which are disposed symmetrically, two second fitting portions 53 which are disposed symmetrically, and two first engaging parts 54 which are disposed symmetrically. A bottom of the first bottom groove 51 and a bottom of the second bottom groove 52 are located on a same plane, i.e., there is no distance between the bottom of the first bottom groove 51 and the bottom of the second bottom groove 52 along the rotating axis X. Please also refer to FIG. 2 and FIG. 3. FIG. 2 is a schematic diagram showing the transmission mechanism of the lock 1 of FIG. 1 in an unlocked state. FIG. 3 is a schematic diagram showing the transmission mechanism of the lock 1 of FIG. 1 in a locked state. In FIG. 2 and FIG. 3, the tubular connecting element 7 of the transmission mechanism is omitted for clearly showing the direction of the transmission element 4. The transmission cam 6 includes two sliding slopes 61 (only one is shown) which are disposed symmetrically and two second engaging parts 62 (only one is shown) which are disposed symmetrically. The second engaging parts 62 are notches concaved from a peripheral wall of the transmission cam 6, and shapes of the second engaging parts 62 are corresponding to shapes of the first engaging parts 54. When the lock 1 is in the unlocked state, the second fitting portions 53 of the moving component 5 are separated from the first fitting portions 22 of the first cover plate 21 (not shown). Meanwhile, as shown in FIG. 2, each of the abutting portions 41 of the transmission element 4 is located at a first end 61a of one of the sliding slopes 61, and each of the first engaging parts 54 is engaged with one of the second engaging parts 62. When the lock 1 is in the locked state, the second fitting portions 53 of the moving component 5 are fitted into the first fitting portions 22 of the first cover plate 21 (not shown). Meanwhile, as shown in FIG. 3, each of the abutting portions 41 of the transmission element 4 is located at a second end 61b of one of the sliding slopes 61, and each of the first engaging parts 54 is separated from one of the second engaging parts 62. When the lock 1 is desired to be switched from the unlocked state to the locked state, the transmission element 4 can be operated to rotate along a first direction D1 (shown in FIG. 2), such that each of the abutting portions 41 of the transmission element 4 slides along one of the sliding slopes 61 from the first end 61a to the second end 61b. In contrary, when the lock 1 is desired to be switched from the locked state to the unlocked state, the transmission element 4 can be operated to rotate along a second direction D2 (shown in FIG. 3), such that each of the abutting portions 41 of the transmission element 4 slides along one of the sliding slopes 61 from the second end 61b to the first end 61a. In other words, when the lock 1 is switched between the unlocked state and the locked state, the abutting portions 41 of the transmission element 4 slide along the sliding slopes 61, such that the transmission element 4 rotates about the rotating axis X and moves along the rotating axis X (also called axial movement). When operated, a user needs to spend more effort to allow the transmission element 4 to move along the rotating axis X. It is less smooth in use.

The lock 1 can further include a latch mechanism (not shown). When assembling the lock 1, the latch mechanism is installed on the door first, and then the first handle set 2 and the transmission mechanism are assembled to form an outer side assembly. The outer side assembly is disposed on a side of the door, the tubular connecting element 7, the transmission element 4, two screw posts 8 are inserted through holes of the latch mechanism corresponding thereto, and are aligned and connected with the second handle set 3. However, when the outer side assembly of the lock 1 is in the locked state (shown in FIG. 3), the transmission cam 6 and the tubular connecting element 7 are capable of rotating 90 degrees unidirectionally. When assembling the lock 1, if the transmission cam 6 and the tubular connecting element 7 are accidentally rotated 90 degrees prior to be inserted through the latch mechanism (not shown), the positions of the first engaging parts 54 are not corresponding to the positions of the second engaging parts 62. Accordingly, the lock 1 is incapable of functioning normally.

SUMMARY OF THE INVENTION

According to an embodiment of the present disclosure, a transmission mechanism applied to a lock and for controlling the lock to switch between an unlocked state and a locked state is disclosed. The lock defines a rotating axis and is for being installed on a door. The door includes a first side and a second side opposite to the first side. The lock includes a first handle set and a second handle set. The first handle set is disposed on the first side of the door. The second handle set is disposed on the second side of the door. The first handle set includes a first cover plate fixedly disposed on the first side of the door. The first cover plate includes a first fitting portion. The transmission mechanism includes a transmission element and a moving component. The transmission element is connected to the first handle set in a manner that the transmission element is incapable of moving along the rotating axis. The transmission element has an abutting portion. The moving component is disposed on the transmission element in a manner that the moving component is capable of moving along the rotating axis. The moving component includes a first engaging groove, a second engaging groove and a second fitting portion. The first engaging groove is formed on a side of the moving component. The second engaging groove is formed on the side of the moving component. The second fitting portion is configured for corresponding to the first fitting portion. When the transmission element is operated to rotate, the abutting portion is capable of switching between the first engaging groove and the second engaging groove. When the abutting portion is located in the first engaging groove, the second fitting portion is configured to be separated from the first fitting portion, such that the lock is in the unlocked state. When the abutting portion is located in the second engaging groove, the second fitting portion is configured to be fitted into the first fitting portion, such that the lock is in the locked state.

According to another embodiment of the present disclosure, a lock defining a rotating axis and for being installed on a door is disclosed. The door includes a first side and a second side opposite to the first side. The lock includes a first handle set, a second handle set and the aforementioned transmission mechanism. The first handle set is disposed on the first side of the door. The first handle set includes a first cover plate and a lock element. The first cover plate is fixedly disposed on the first side of the door. The second handle set is disposed on the second side of the door. The transmission element is connected to the lock element in a manner that the transmission element and the lock element are capable of moving synchronously. When the lock element is operated to switch between a first state and a second state, the lock element drives the transmission element to rotate, such that the abutting portion is capable of switching between the first engaging groove and the second engaging groove.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part thereof, and in which is shown by way of illustration specific embodiments in which the disclosure may be practiced. In this regard, directional terminology, such as top, bottom, left, right, front or back, is used with reference to the orientation of the Figure (s) being described. The components of the present disclosure can be positioned in a number of different orientations. As such, the directional terminology is used for purposes of illustration and is in no way limiting. In addition, identical or similar numeral references are used for identical components or similar components in the following embodiments. Accordingly, the drawings and descriptions will be regarded as illustrative in nature and not as restrictive.

In the present disclosure, "independent" is used to describe two elements are independent from each other in operation. For example, when one element is operated to rotate, the other element does not rotate with the element.

The First Embodiment

Please refer to FIG. 4 to FIG. 8. A transmission mechanism (not labelled) applied to a lock 10 and for controlling the lock 10 to switch between an unlocked state and a locked state is disclosed. The lock 10 defines a rotating axis X and is for being installed on a door (not shown). The door includes a first side and a second side opposite to the first side. The lock 10 includes a first handle set 100 and a second handle set 200. The first handle set 100 is disposed on the first side of the door, and the second handle set 200 is disposed on the second side of the door. The first handle set 100 includes a first cover plate 140 fixedly disposed on the first side of the door.

Figure 12:
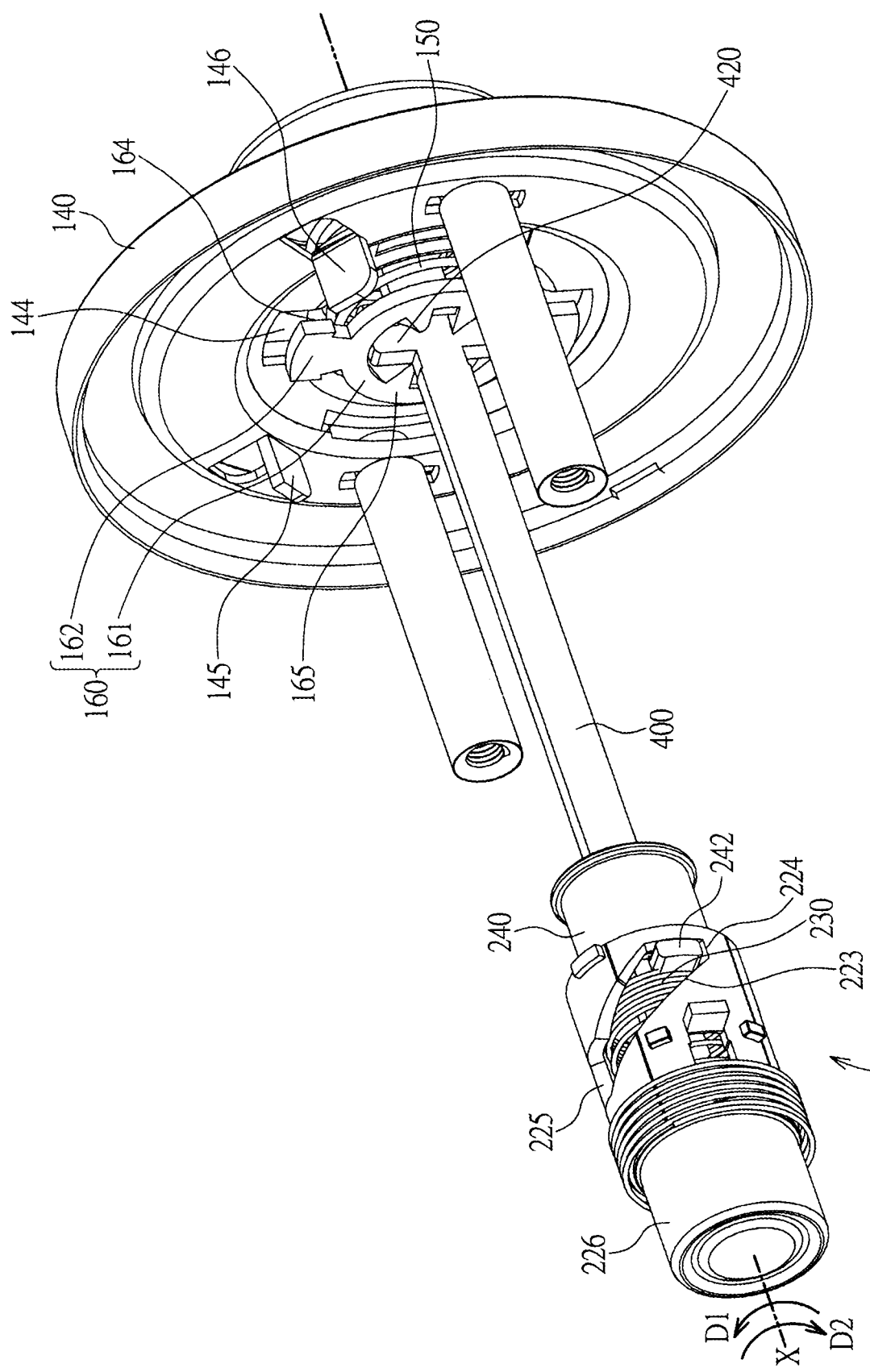
FIG. 12 is a schematic diagram showing a first cover plate and a transmission mechanism of FIG. 5 in an unlocked state.
Figure 13:
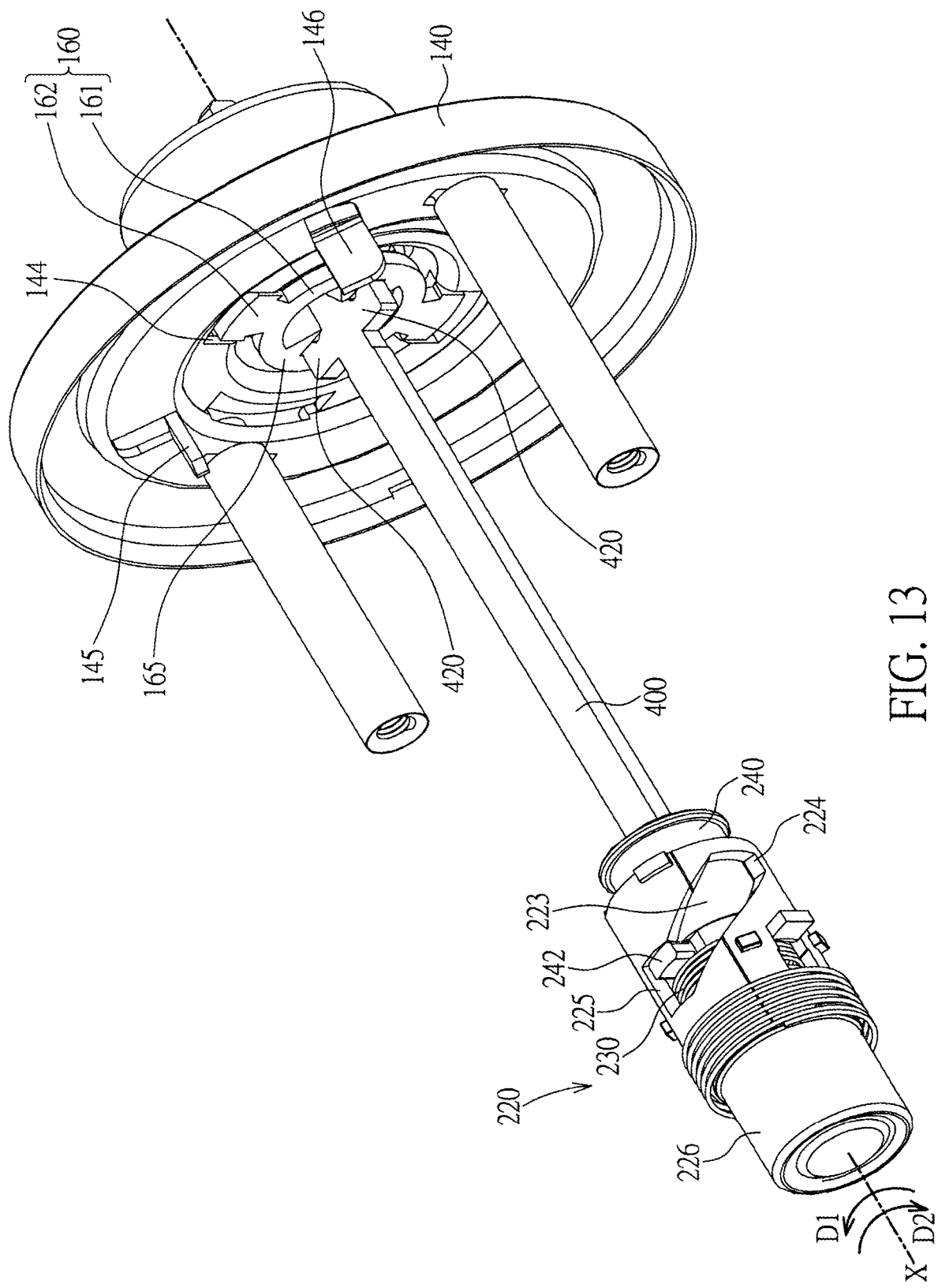
FIG. 13 is a schematic diagram showing the first cover plate and the transmission mechanism of FIG. 5 in a locked state.

Please refer to FIG. 12 to FIG. 13. The first cover plate 140 includes two first fitting portions 144 which are disposed symmetrically. The number of the first fitting portions 144 is exemplary. The transmission mechanism includes a transmission element 400 and a moving component 160. The transmission element 400 is connected to the first handle set 100 in a manner that the transmission element 400 is incapable of moving along the rotating axis X. The transmission element 400 has two abutting portions 420 which are disposed symmetrically. The number of the abutting portions 420 is exemplary. The moving component 160 is disposed on the transmission element 400 in a manner that the moving component 160 is capable of moving along the rotating axis X.

Figure 9:
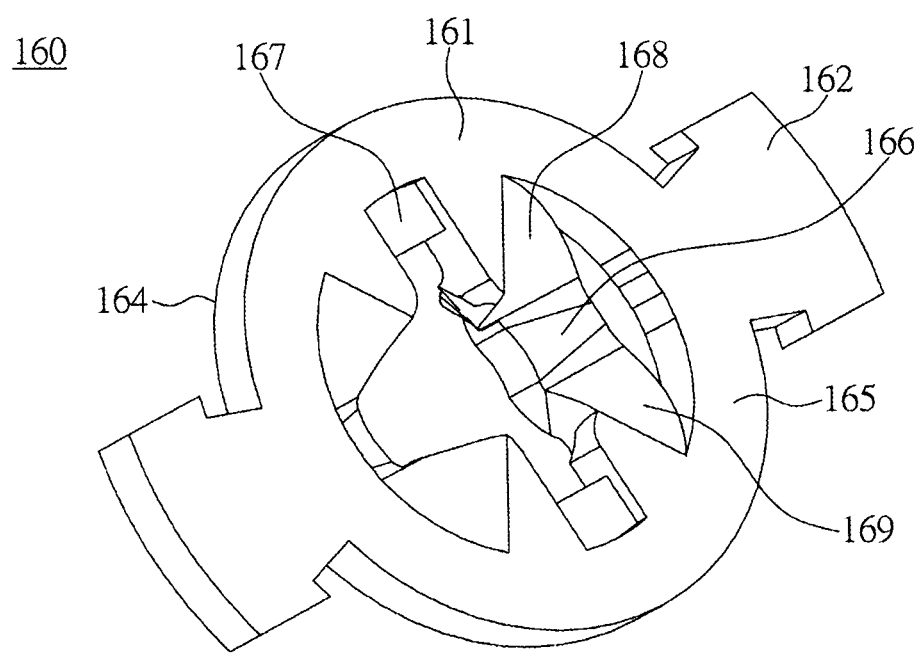
FIG. 9 is a three-dimensional diagram showing a moving component of FIG. 5.
Figure 10:
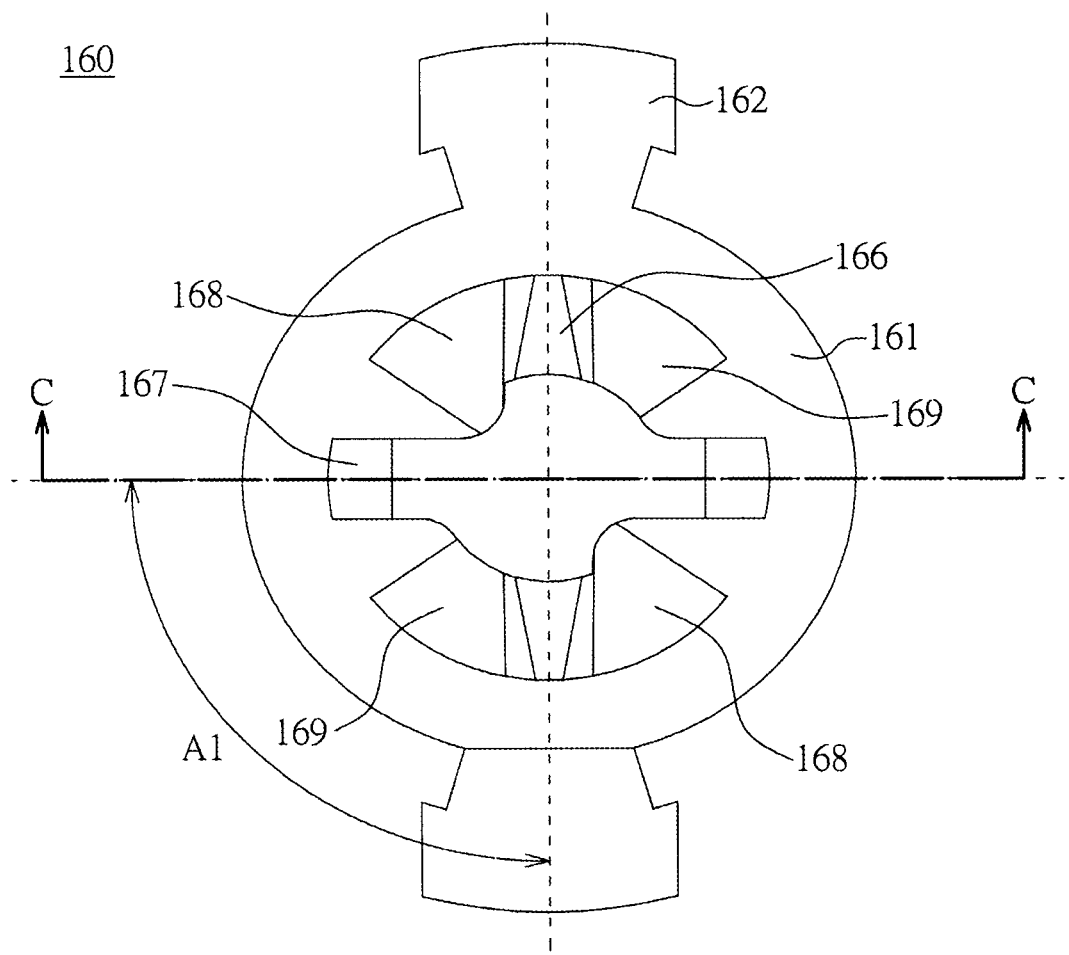
FIG. 10 is a plane view showing the moving component of FIG. 5.
Figure 11:
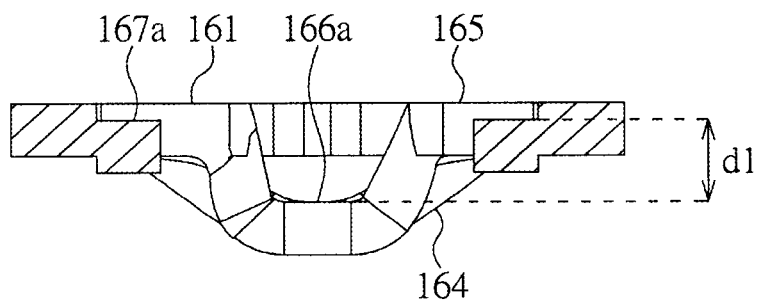
FIG. 11 is a cross-sectional view of the moving component taken along line C-C in FIG. 10.

Please refer to FIG. 9 to FIG. 11. The moving component 160 includes two first engaging grooves 166, two second engaging grooves 167 and two second fitting portions 162. The numbers of the first engaging grooves 166, the second engaging grooves 167 and the second fitting portions 162 are exemplary. The two first engaging grooves 166 are disposed symmetrically. The two second engaging grooves 167 are disposed symmetrically. The two second fitting portions 162 are disposed symmetrically. The first engaging grooves 166 and the second engaging grooves 167 are formed on a side 165 of the moving component 160. The second fitting portions 162 are configured for corresponding to the first fitting portions 144. When the transmission element 400 is operated to rotate, the abutting portions 420 are capable of switching between the first engaging grooves 166 and the second engaging grooves 167. As shown in FIG. 12, when the abutting portions 420 are located in the first engaging grooves 166, the second fitting portions 162 are configured to be separated from the first fitting portions 144, such that the lock 10 is in the unlocked state. As shown in FIG. 13, when the abutting portions 420 are located in the second engaging grooves 167, the second fitting portions 162 are configured to be fitted into the first fitting portions 144, such that the lock 10 is in the locked state.

With the aforementioned structure, the transmission mechanism controls the lock 10 to switch between the unlocked state and the locked state by the movement of the moving component 160 along the rotating axis X, such that the second fitting portions 162 are capable of being separated from the first fitting portions 144 or being fitted into the first fitting portions 144. The transmission element 400 only rotates about the rotating axis X and is incapable of moving along the rotating axis X (hereinafter, also called axial movement). Accordingly, the operation resistance can be reduced, and the operation smoothness can be enhanced.

Specifically, as shown in FIG. 9 and FIG. 10, the moving component 160 can further include two guiding surfaces 168 and two stop surfaces 169. The numbers of the guiding surfaces 168 and the stop surfaces 169 are exemplary. Each of the guiding surfaces 168 is disposed on a side of the first engaging groove 166 and located between the first engaging groove 166 and the second engaging groove 167. Each of the stop surfaces 169 is opposite to the guiding surface 166 and is disposed on another side of the first engaging groove 166. The guiding surface 168 is for guiding the abutting portion 420 to move from the first engaging groove 166 to the second engaging groove 167 or from the second engaging groove 167 to the first engaging groove 166 through the guiding surface 168. The stop surface 169 is for stopping the abutting portion 420 to move from the first engaging groove 166 to the second engaging groove 167 or from the second engaging groove 167 to the first engaging groove 166 through the stop surface 169. As such, in FIG. 9, the abutting portion 420 can only move from the first engaging groove 166 to the second engaging groove 167 along a counter-clockwise direction, or can only move from the second engaging groove 167 to the first engaging groove 166 along a clockwise direction. As shown in FIG. 10, an included angle A1 is between the first engaging groove 166 and the second engaging groove 167. The included angle A1 can be greater than 0 degree and less than or equal to 90 degrees. In the embodiment, the included angle A1 is equal to 90 degrees.

Please refer to FIG. 11. The first engaging groove 166 of the moving component 160 has a first bottom 166a. The second engaging groove 167 of the moving component 160 has a second bottom 167a. A distance d1 is between the first bottom 166a and the second bottom 167a along the rotating axis X. As such, when the transmission element 400 is operated to rotate, the transmission element 400 is incapable of axial movement, and the moving component 160 is pushed by the transmission element 400 to move along the rotating axis X. The displacement of the moving component 160 is substantially equal to d1.

Please refer to FIG. 12. The first fitting portions 144 are concaved from a surface of the first cover plate 140. The moving component 160 can further include a main body 161. The second fitting portions 162 are extended outwardly from the main body 161 along a direction perpendicular to the rotating axis X.

Please refer to FIGS. 5, 6, 12 and 13. The transmission mechanism can further include a first elastic element 150 abutting against another side 164 of the moving component 160. When the transmission element 400 is operated to rotate, and the abutting portions 420 are moved from the first engaging grooves 166 to the second engaging grooves 167 (i.e., from the state of FIG. 12 to the state of FIG. 13), the abutting portions 420 push the moving component 160 to move along the rotating axis X and towards the first elastic element 150, such that the second fitting portions 162 are fitted into the first fitting portions 144, the first elastic element 150 accumulates an elastic force, and the lock 10 is in the locked state. When the transmission element 400 is operated to rotate and the abutting portions 420 are moved from the second engaging grooves 167 to the first engaging grooves 166 (i.e., from the state of FIG. 13 to the state of FIG. 12), the first elastic element 150 releases the elastic force to push the moving component 160 to move along the rotating axis X and away from the first elastic element 150, such that the second fitting portions 162 are separated from the first fitting portions 144, and the lock 10 is in the unlocked state.

Figure 1:
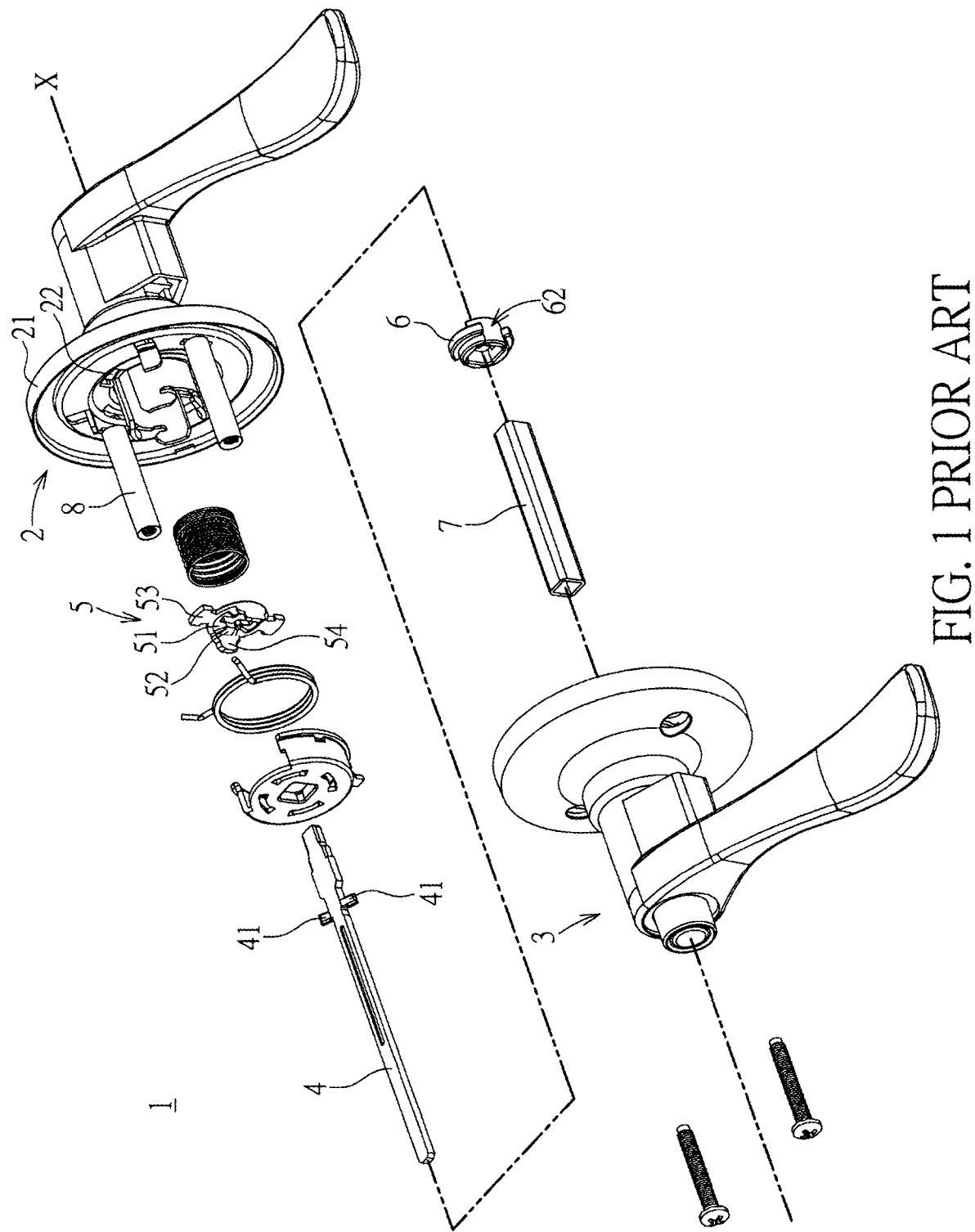
FIG. 1 is an exploded diagram showing a lock of prior art.
Figure 2:
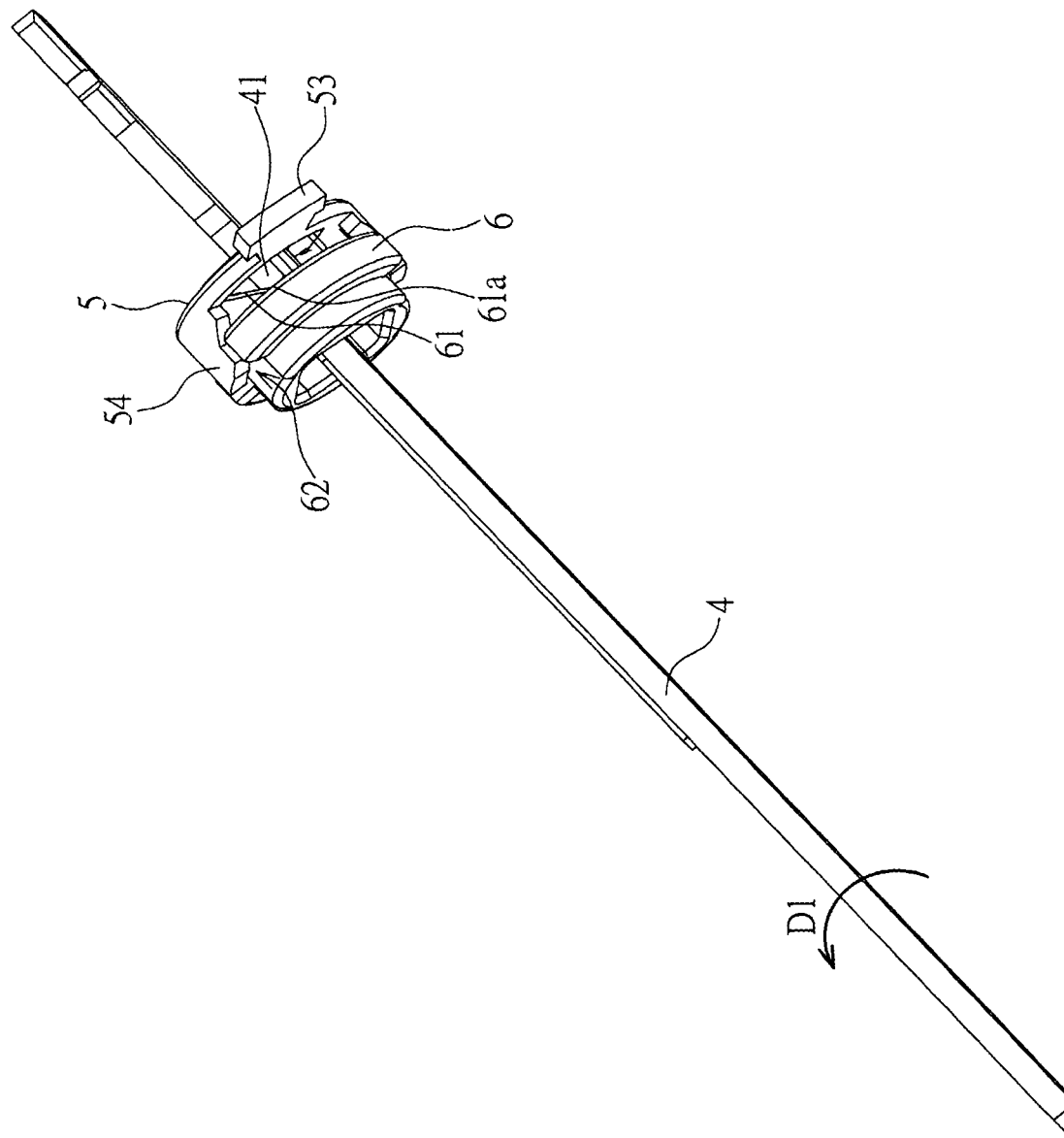
FIG. 2 is a schematic diagram showing a transmission mechanism of the lock of FIG. 1 in an unlocked state.
Figure 3:
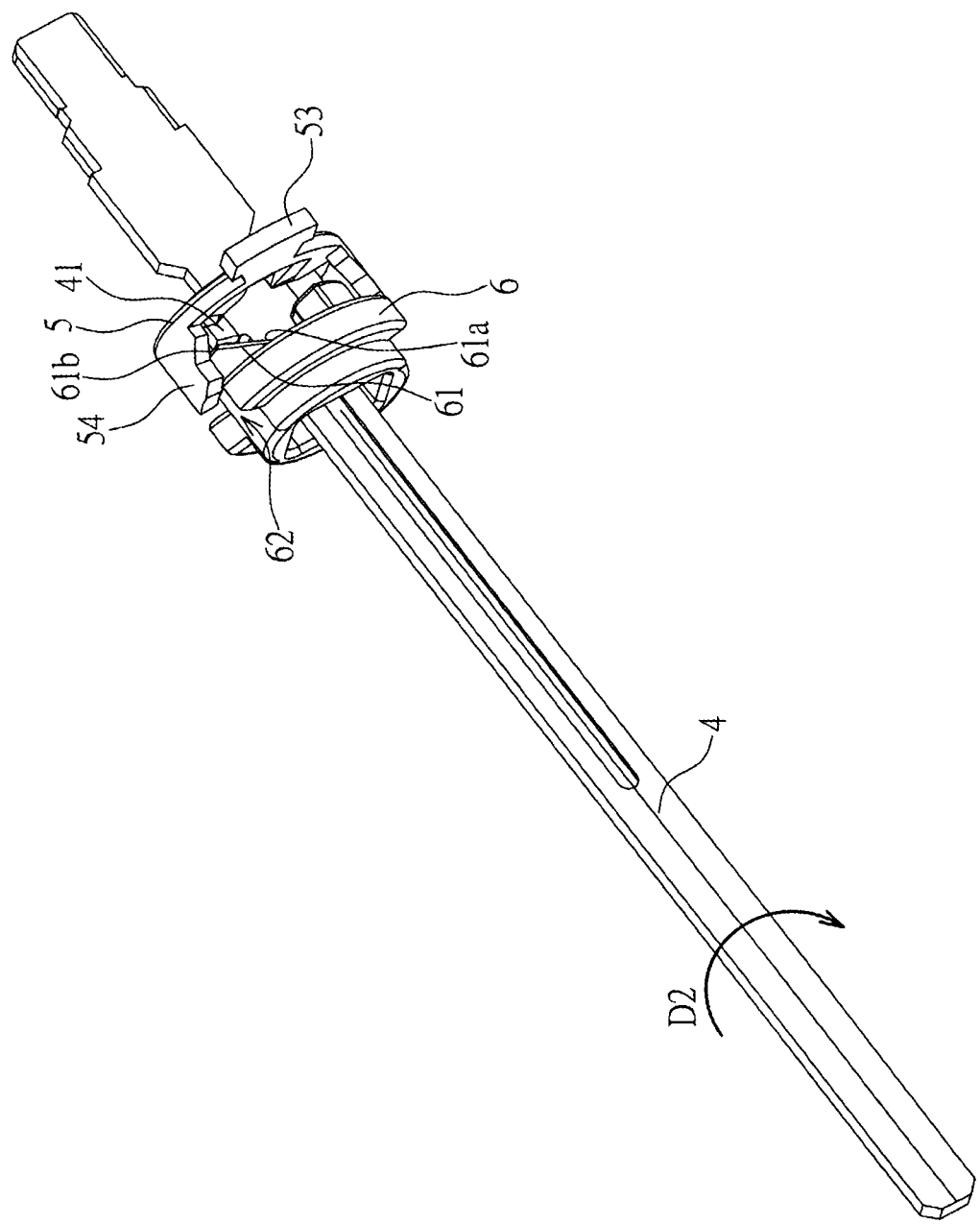
FIG. 3 is a schematic diagram showing the transmission mechanism of the lock of FIG. 1 in a locked state.
Figure 4:
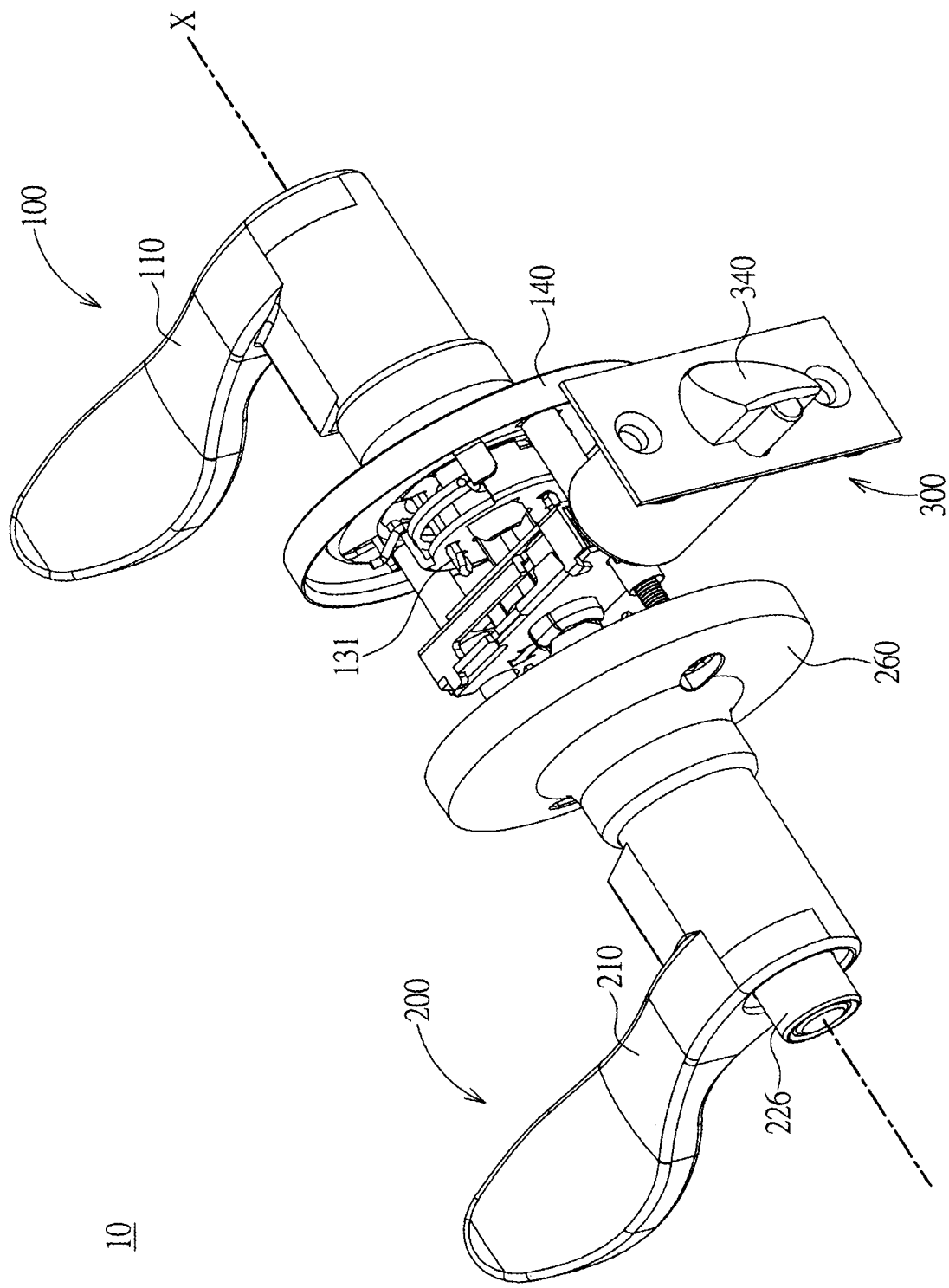
FIG. 4 is a three-dimensional diagram showing a lock according to a first embodiment of the present disclosure.
Figure 5:
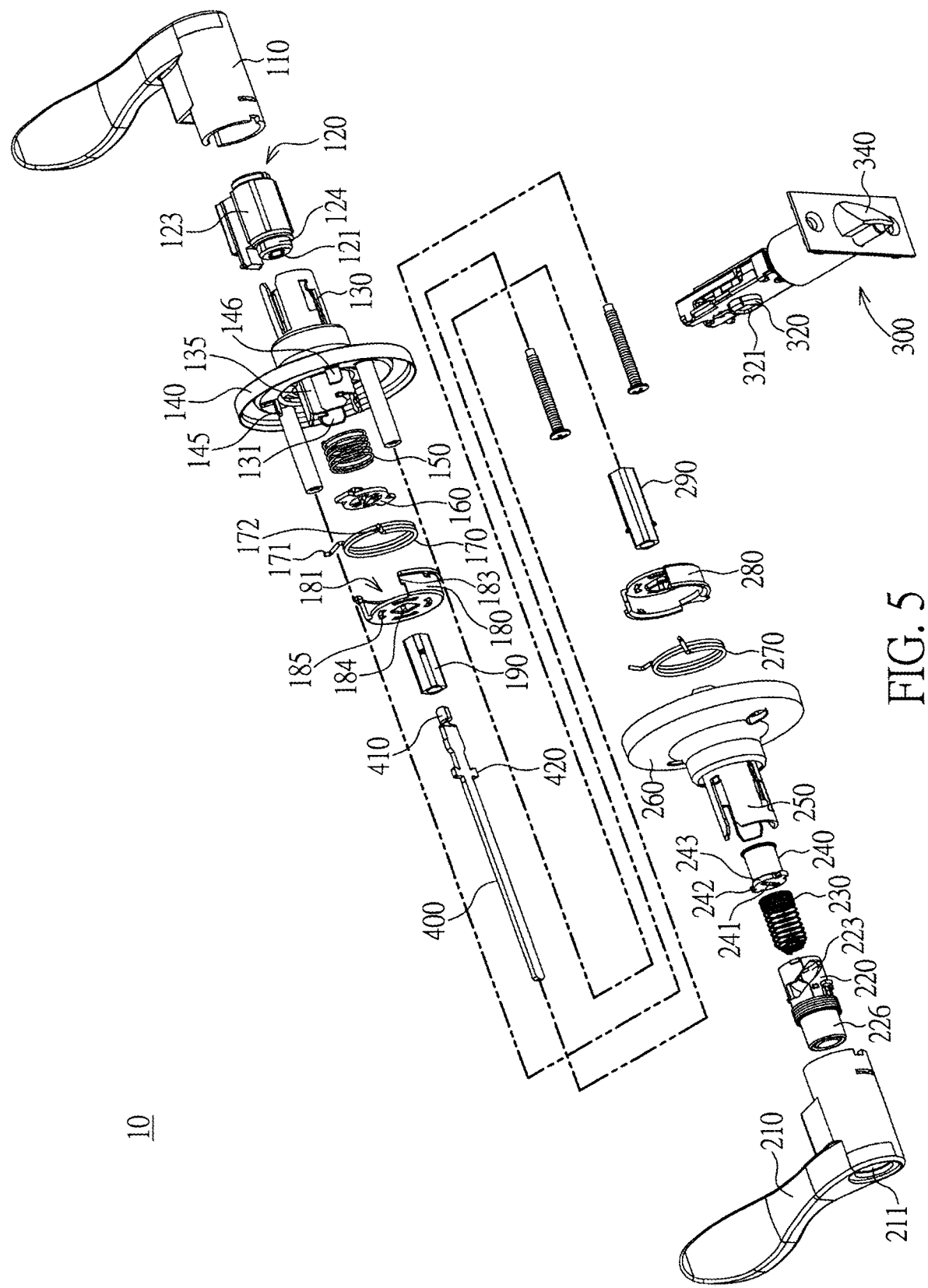
FIG. 5 is an exploded diagram showing the lock of FIG. 4.
Figure 6:
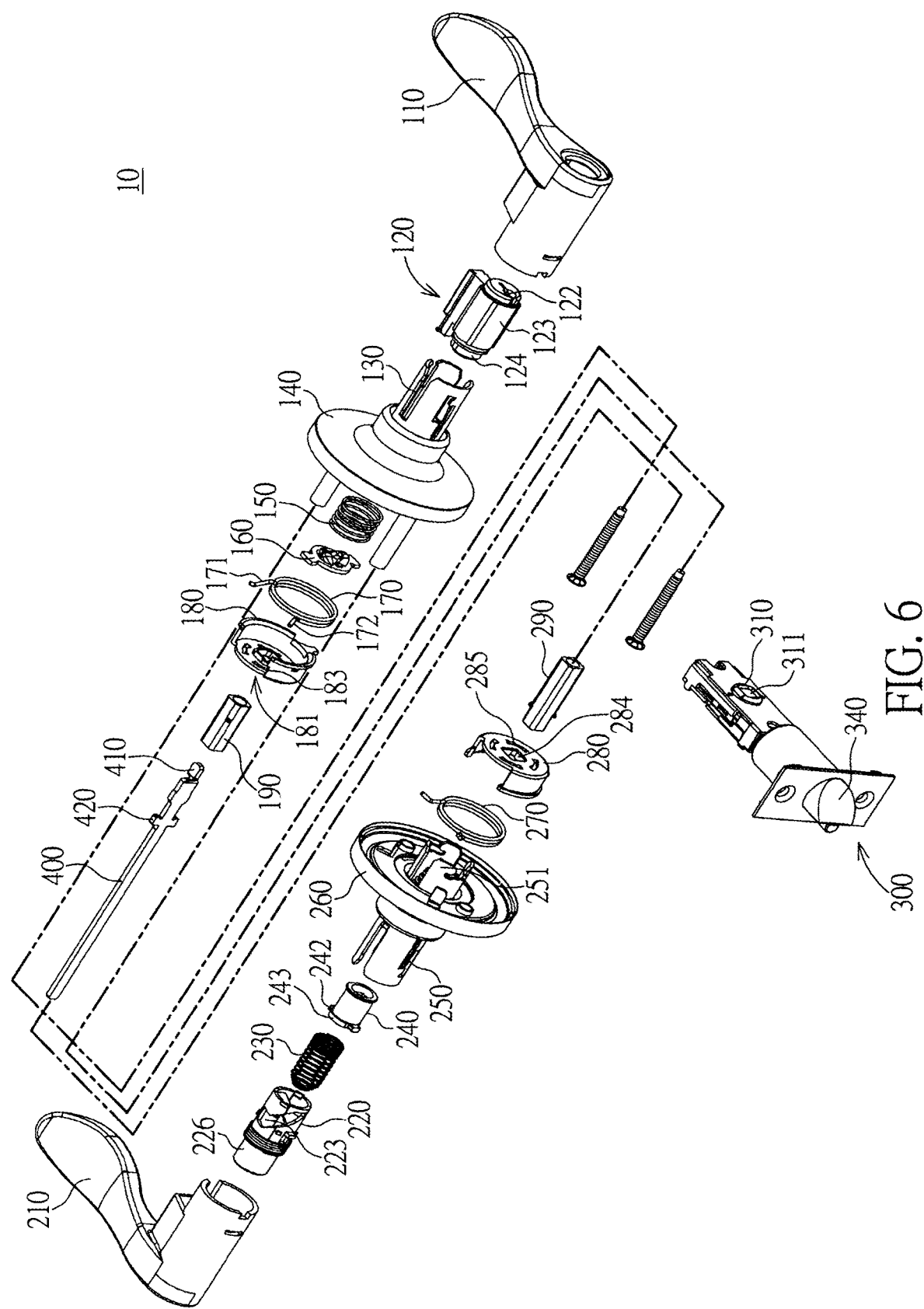
FIG. 6 is another exploded diagram showing the lock of FIG. 4.

Please refer to FIGS. 5, 6, 12 and 13. The transmission mechanism can further include a cylindrical element 220 and a movable element 240. The cylindrical element 220 is disposed in the second handle set 200. The cylindrical element 220 includes two guiding tracks 223 (only one is shown) which are symmetrically disposed. The number of the guiding tracks 223 is exemplary. Each of the guiding tracks 223 has an unlocked end 224 and a locked end 225 opposite to the unlocked end 224. The movable element 240 is disposed in the cylindrical element 220 in a manner that the movable element 240 is capable of moving along the guiding tracks 223. The movable element 240 is connected to the transmission element 400 in a manner that the movable element 240 and the transmission element 400 are capable of moving synchronously. As shown in FIG. 5, the movable element 240 includes a main body 243, a limiting hole 241 and two guiding parts 242 corresponding to the two guiding tracks 223. The number of the guiding parts 242 is exemplary. In the embodiment, each of the guiding parts 242 is a lug structure which is extended outwardly along a direction perpendicular to the rotating axis X. The limiting hole 241 is formed in the main body 243 and is inserted with the transmission element 400. Herein, cross sections of the limiting hole 241 and the transmission element 400 are rectangular, such that the limiting hole 241 and the transmission element 400 are capable of rotating together. The guiding parts 242 are extended outwardly from the main body 243 along the direction perpendicular to the rotating axis X. The guiding parts 242 are movably disposed in the guiding tracks 223. The transmission element 400 can further include a second elastic element 230 disposed in the cylindrical element 220 and abutting against a side of the movable element 240.

As shown in FIG. 12 and FIG. 13, when the cylindrical element 220 is operated to move along the rotating axis X and towards the first handle set 100, the movable element 240 is guided by the guiding tracks 223 to move from the unlocked ends 224 to the locked ends 225 (from the state of FIG. 12 to the state of FIG. 13) to drive the transmission element 400 to rotate, such that the lock 10 is switched from the unlocked state to the locked state. As this time, the second elastic element 230 is pushed against by the movable element 240 and accumulates an elastic force.

As shown in FIG. 12 and FIG. 13, when the movable element 240 is located at the locked ends 225 (as shown in FIG. 13), and the cylindrical element 220 is operated to rotate along a first direction D1, the second elastic element 230 releases the elastic force to push the movable element 240, the movable element 240 is guided by the guiding tracks 223 to move from the locked ends 225 to unlocked ends 224 to drive the transmission element 400 to rotate, such that the lock 10 is switched from the locked state to the unlocked state. When the movable element 240 is located at the locked ends 225 (as shown in FIG. 13), and the cylindrical element 220 is operated to rotate along a second direction D2 opposite to the first direction D1, the locked ends 225 of the guiding tracks 223 push the guiding parts 242 of the movable element 240, which enables the movable element 240 to be driven by the cylindrical element 220 to rotate along the second direction D2 to drive the transmission element 400 to rotate along the second direction D2, such that the lock 10 is switched from the locked state to the unlocked state. In other words, when the lock 10 is in the locked state, no matter the cylindrical element 220 is operated to rotate along the first direction D1 or the second direction D2, the transmission element 400 can be driven to rotate, which enables the lock 10 to be switched from the locked state to the unlocked state.

More specifically, as shown in FIG. 4 to FIG. 8, the lock 10 can further include a latch mechanism 300. The latch mechanism 300 is disposed between the first handle set 100 and the second handle set 200. The latch mechanism 300 includes a latch tongue 340, a first transfer shaft 310 and a second transfer shaft 320. The first transfer shaft 310 is independent from the second transfer shaft 320. When the first transfer shaft 310 is operated to rotate, the latch tongue 340 can be driven to retract or stretch out. When the second transfer shaft 320 is operated to rotate, the latch tongue 340 can be driven to retract or stretch out.

The first handle set 100 can further include a first handle 110, a lock element 120, a first axial tube 130, a first restoring element 170, a first driving element 180 and a first tubular element 190. The lock element 120 is disposed in the first handle 110 in a manner that the lock element 120 and the first handle 110 are capable of rotating together. The first handle 110 is disposed at an end of the first axial tube 130 through engagement, such that the first handle 110 is connected to the first axial tube 130 in a manner that the first handle 110 and the first axial tube 130 are capable of moving synchronously. An inner end of the first handle 110 is inserted between the first axial tube 130 and the first cover plate 140 (shown in FIG. 7), such that the first handle 110 is connected to the first cover plate 140 in a manner that the first handle 110 is capable of rotating relative to the first cover plate 140. Another end of the first axial tube 130 has four hooks 131 engaged with four hook slots 185 of the first driving element 180, such that the first axial tube 130 is connected to the first driving element 180 in a manner that the first axial tube 130 and the first driving element 180 are capable of moving synchronously. The first restoring element 170 is configured to provide a restoring force for the first driving element 180 to return to its initial position after being rotated. An end of the first tubular element 190 is inserted in the center hole 184 of the first driving element 180. Cross sections of the first tubular element 190 and the center hole 184 are square, such that the first tubular element 190 is connected to the first driving element 180 in a manner that the first tubular element 190 and the first driving element 180 are capable of moving synchronously. Another end of the first tubular element 190 is inserted in a first transfer hole 311 of the first transfer shaft 310. Cross sections of the first tubular element 190 and the first transfer hole 311 are square, such that the first tubular element 190 is connected to the first transfer shaft 310 in a manner that the first tubular element 190 and the first transfer shaft 310 are capable of moving synchronously. Furthermore, the two second fitting portions 162 of the moving component 160 protrude from the two limiting grooves 135 (shown in FIG. 5) of the first axial tube 130, respectively. As such, the moving component 160 is incapable of rotating relative to the first axial tube 130, and is connected to the first axial tube 130 in a manner that the moving component 160 and the first axial tube 130 are capable of moving synchronously. With the aforementioned arrangement, the first handle 110, the lock element 120, the first axial tube 130, the moving component 160, the first driving element 180, the first tubular element 190 and the first transfer shaft 310 are connected and capable of moving synchronously with each other, i.e., capable of rotating with each other. Furthermore, the transmission element 400 is connected to the lock element 120 in a manner that the transmission element 400 and the lock element 120 are capable of moving synchronously. When the lock element 120 is operated to switch between a first state and a second state (such as the locked state and the unlocked state), the lock element 120 drives the transmission element 400 to rotate, such that the abutting portions 420 are capable of switching between the first engaging grooves 166 and the second engaging grooves 167. Specifically, the lock element 120 can include an outer cylinder 123 and a lock cylinder 124. The lock cylinder 124 can be operated to rotate relative to the outer cylinder 123, such that the lock element 120 is capable of switching between the locked state and the unlocked state. The transmission element 400 can be connected to the lock cylinder 124 through engagement. When the lock cylinder 124 is operated to rotate relative to the outer cylinder 123, the transmission element 400 can be driven to rotate together.

The second handle set 200 can further include a second handle 210, a second axial tube 250, a second cover plate 260, a second restoring element 270, a second driving element 280 and a second tubular element 290. The second handle 210 is disposed at an end of the second axial tube 250 through engagement, such that the second handle 210 is connected to the second axial tube 250 in a manner that the second handle 210 and the second axial tube 250 are capable of moving synchronously. An inner end of the second handle 210 is inserted between the second axial tube 250 and the second cover plate 260 (shown in FIG. 7), such that the second handle 210 is connected to the second cover plate 260 in a manner that the second handle 210 is capable of rotating relative to the second cover plate 260. Another end of the second axial tube 250 has four hooks 251 engaged with four hook slots 285 of the second driving element 280, such that the second axial tube 250 is connected to the second driving element 280 in a manner that the second axial tube 250 and the second driving element 280 are capable of moving synchronously. The second restoring element 270 is configured to provide a restoring force for the second driving element 280 to return to its initial position after being rotated. An end of the second tubular element 290 is inserted in the center hole 284 of the second driving element 280. Cross sections of the second tubular element 290 and the center hole 284 are square, such that the second tubular element 290 is connected to the second driving element 280 in a manner that the second tubular element 290 and the second driving element 280 are capable of moving synchronously. Another end of the second tubular element 290 is inserted in the second transfer hole 321 of the second transfer shaft 320. Cross sections of the second tubular element 290 and the second transfer hole 321 are square, such that the second tubular element 290 is connected to the second transfer shaft 320 in a manner that the second tubular element 290 and the second transfer shaft 320 are capable of moving synchronously. With the aforementioned arrangement, the second handle 210, the second axial tube 250, the second driving element 280, the second tubular element 290 and the second transfer shaft 320 are connected and capable of moving synchronously with each other, i.e., capable of rotating with each other. Furthermore, the cylindrical element 220 of the transmission mechanism is disposed in the second handle 210 in a manner that the cylindrical element 220 and the second handle 210 are capable of rotating together. The cylindrical element 220 can further include a button 226. The button 226 is exposed to outside through a penetrating hole 211 of the second handle 210.

In the embodiment, cross sections of the center hole 184, the first tubular element 190 and the first transfer hole 311 are square, such that the first driving element 180, the first tubular element 190 and the first transfer shaft 310 are connected and capable of moving synchronously with each other. Cross sections of the center hole 284, the second tubular element 290 and the second transfer hole 321 are square, such that the second driving element 280, the second tubular element 290 and the second transfer shaft 320 are connected and capable of moving synchronously with each other. However, the present disclosure is not limited thereto. In other embodiments, the cross sections of the center hole 184, the first tubular element 190, the first transfer hole 311, the center hole 284, the second tubular element 290 and the second transfer hole 321 can be formed in other non-circular shapes, such as semicircular shapes, triangular shapes or pentagonal shapes, which can also achieve the same functionality.

Figure 7:
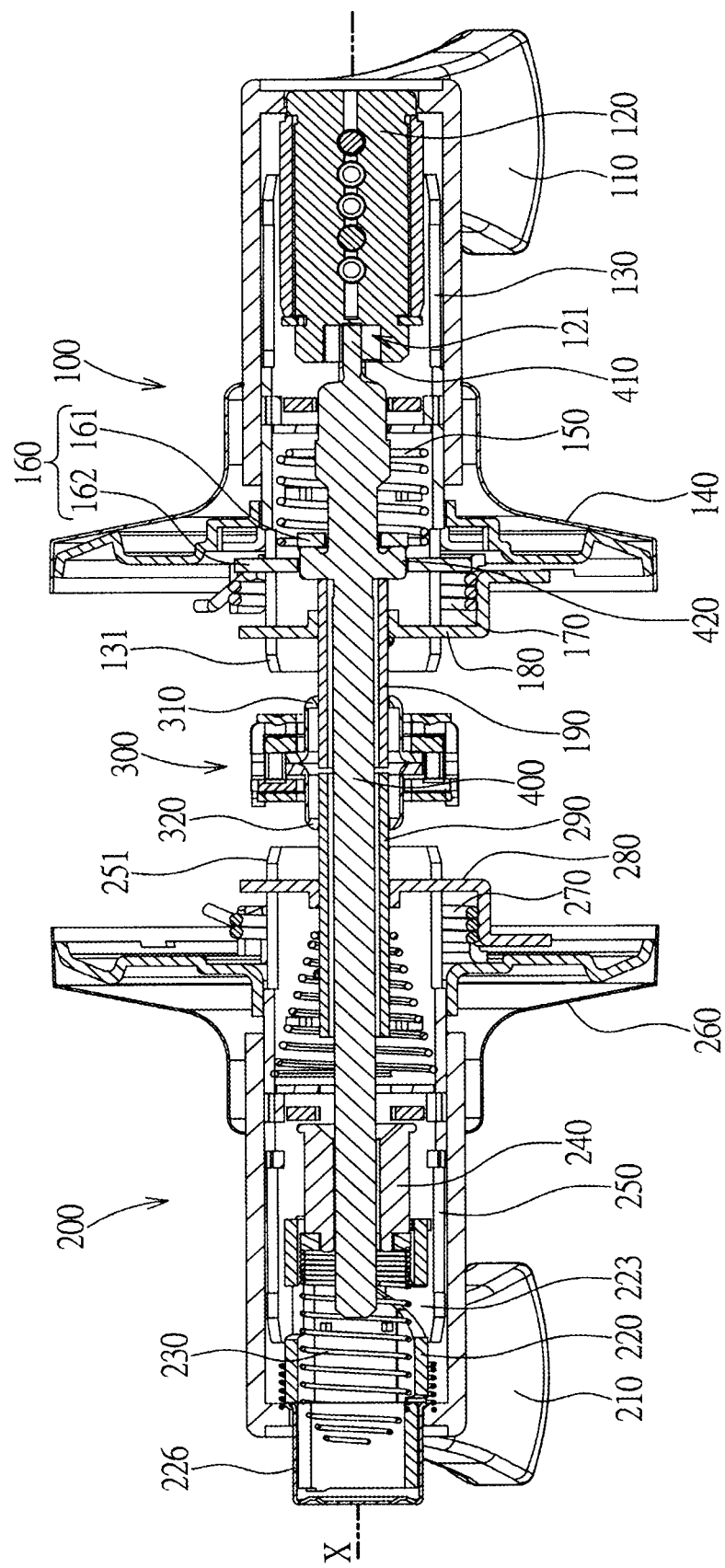
FIG. 7 is a cross-sectional view of the lock of FIG. 4.
Figure 8:
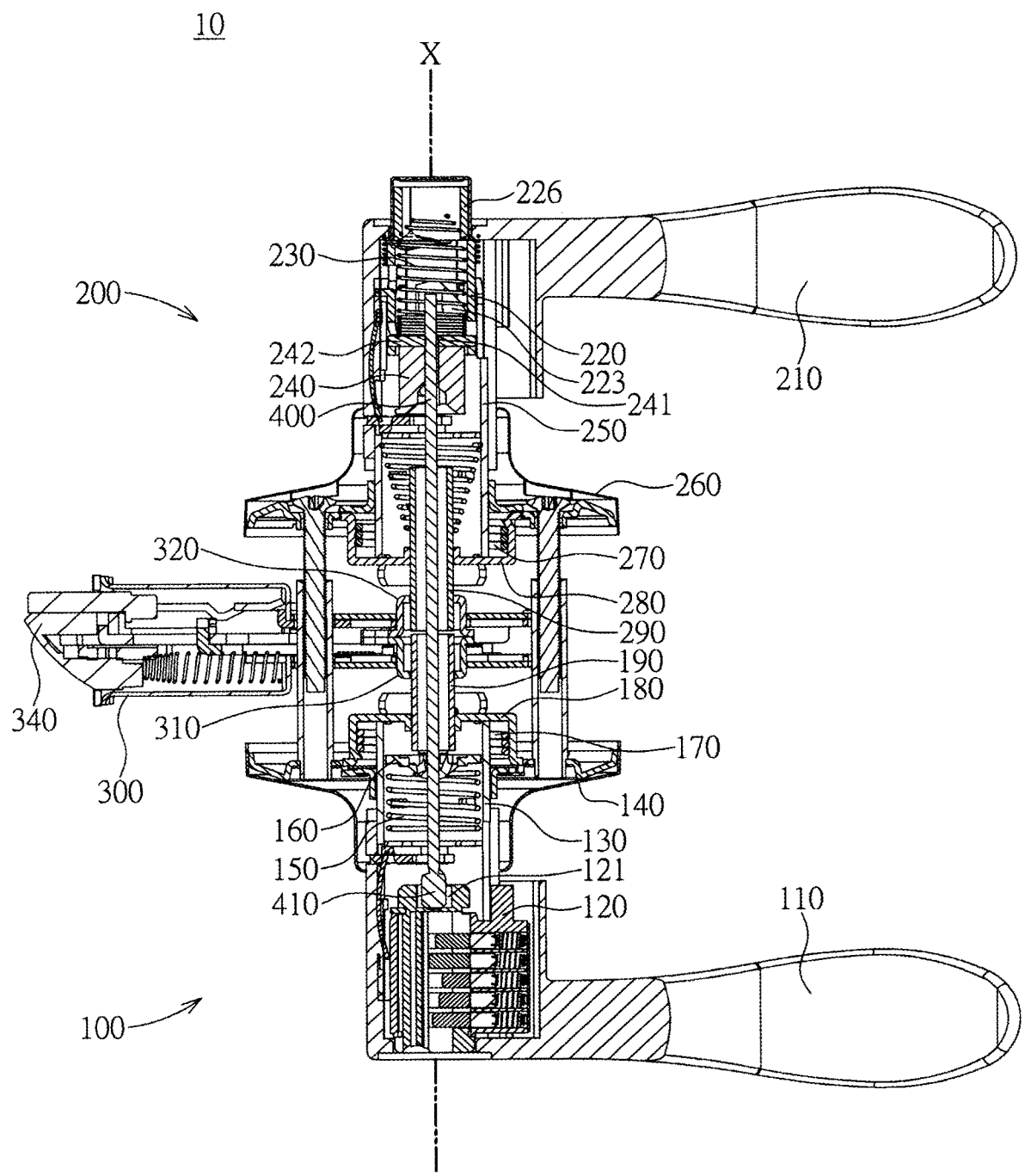
FIG. 8 is another cross-sectional view of the lock of FIG. 4.

The first tubular element 190 and the second tubular element 290 are for independently driving the latch tongue 340 of the latch mechanism 300 to retract or stretch out. As shown in FIG. 7 and FIG. 8, the first tubular element 190 and the second tubular element 290 are independent from each other. That is, when the first tubular element 190 is rotated, the second tubular element 290 does not rotate therewith, and vice versa. The first transfer shaft 310 and the second transfer shaft 320 are independent from each other. That is, when the first transfer shaft 310 is rotated, the second transfer shaft 320 does not rotate therewith, and vice versa. How to drive the latch tongue 340 with the first transfer shaft 310 and the second transfer shaft 320 is conventional and is omitted herein.

In the embodiment, as shown in FIG. 7 and FIG. 8, the first end 410 and the abutting portions 420 are abutted by a bottom of a accommodating groove 121 of the lock element 120 and the first tubular element 190, such that the transmission element 400 is incapable of axial movement.

With the aforementioned arrangement, when the lock 10 is in the unlocked state as shown in FIG. 12, the abutting portions 420 are located in the first engaging grooves 166, and the second fitting portions 162 are separated from the first fitting portions 144. Because the second fitting portions 162 are not fitted into the first fitting portions 144, the moving component 160 is capable of rotating relative to the first cover plate 140. Because the moving component 160 is connected to the first handle 110 in a manner that the moving component 160 and the first handle 110 are capable of moving synchronously, the first handle 110 is also capable of rotating relative to the first cover plate 140. When the first handle 110 is pressed downwardly, i.e., the first handle 110 is rotated along the first direction D1, the first driving element 180 and the first tubular element 190 are driven to rotate along the first direction D1, which drives the first transfer shaft 310 to rotate along the first direction D1 to drive the latch tongue 340 to retract to open the door. When the first handle 110 is released, the first restoring element 170 provides the elastic force for the first driving element 180 to rotate along the second direction D2 to return to its initial position, which drives the first handle 110 and the first tubular element 190 to rotate along the second direction D2, such that the first transfer shaft 310 is driven to rotate along the second direction D2 to drive the latch tongue 340 to stretch out to its initial position. Please refer to FIG. 5, in the embodiment, the first restoring element 170 is cooperated with the first limiting post 145 and the second limiting post 146 of the first cover plate 140, and the limiting slot 181 of the first driving element 180 to bring the first driving element 180 to return its initial position. Specifically, when the first handle 110 is pressed downwardly, i.e., the first handle 110 is rotated along the first direction D1, the first driving element 180 is driven to rotate along the first direction D1, a first leg 171 of the first restoring element 170 is blocked by the first limiting post 145 and is incapable of rotating. A second leg 172 of the first restoring element 170 is pushed by an end 183 of the limiting slot 181 and is rotated counterclockwise with the first driving element 180. As such, the first restoring element 170 accumulates an elastic force. When the first handle 110 is released, the first restoring element 170 releases the elastic force which allows the second leg 172 of the first restoring element 170 to push the end 183 of the limiting slot 181, such that the first driving element 180 is driven to rotate along the second direction D2 to return to its initial position before being rotated. When the second handle 210 is pressed downwardly, the latch tongue 340 can be driven to retract to open the door; when the second handle 210 is released, the latch tongue 340 can be driven to stretch out to its initial position. The principle that drives the latch tongue 340 through the second handle 210 is similar to that of the first handle 110 and is not repeated herein.

When the lock 10 is in the locked state, as shown in FIG. 13, the abutting portions 420 are located in the second engaging grooves 167, and the second fitting portions 162 are fitted into the first fitting portions 144. Because the second fitting portions 162 are fitted into the first fitting portions 144, the moving component 160 is incapable of rotating relative to the first cover plate 140. Because the moving component 160 is connected to the first handle 110 in a manner that the moving component 160 and the first handle 110 are capable of moving synchronously. The first handle 110 is incapable of rotating relative to the first cover plate 140, either. As such, the first handle 110 is incapable of driving the latch tongue 340 to retract to open the door.

When the lock 10 is in the unlocked state, the lock 10 can be switched to the locked state by the following methods. In the first method, a key (not shown) is inserted into the keyhole 122 (shown in FIG. 6) of the lock element 120 and rotated, which allows the lock cylinder 124 to rotate relative to the outer cylinder 123 along the first direction D1, and the transmission element 400 is driven to rotate along the first direction D1, such that the lock 10 is in the locked state shown in FIG. 13. In the second method, as shown in FIG. 12, the button 226 is pressed, which allows the cylindrical element 220 to be operated to move along the rotating axis X and towards the first handle set 100, the guiding parts 242 of the movable element 240 are guided by the guiding tracks 223 to move from the unlocked ends 224 to the locked ends 225 to drive the transmission element 400 to rotate along the first direction D1, such that the lock 10 is in the locked state.

When the lock 10 is in the locked state, the lock 10 can be switched to the unlocked state by the following methods. In the first method, the key (not shown) is inserted into the keyhole 122 (shown in FIG. 6) of the lock element 120 and rotated, which drives the lock cylinder 124 to rotate relative to the outer cylinder 123 along the second direction D2, and the transmission element 400 is driven to rotate along the second direction D2, such that the lock 10 is in the unlocked state, as shown in FIG. 12. In the second method, the second handle 210 is pressed downwardly (i.e., the second handle 210 is rotated along the first direction D1) to drive the cylindrical element 220 to rotate along the first direction D1, too. The second elastic element 230 releases the elastic force. The guiding parts 242 of the movable element 240 move from the locked ends 225 to the unlocked ends 224 by the push of the second elastic element 230 and the guidance of the guiding tracks 223. The transmission element 400 is driven to rotate along the second direction D2, such that the lock 10 is in the unlocked state. In the third method, the second handle 210 is pulled upwardly, i.e., the second handle 210 is rotated along the second direction D2 to drive the cylindrical element 220 to rotate along the second direction D2. The locked ends 225 of the guiding tracks 223 push the guiding parts 242 of the movable element 240 to drive the movable element 240 and the cylindrical element 220 to rotate along the second direction D2, and the transmission element 400 is driven to rotate along the second direction D2, such that the abutting portions 420 are moved from the second engaging grooves 167 to the first engaging grooves 166, so as to allow the second fitting portions 162 to separate from the first fitting portions 144. Afterwards, the second handle 210 can be pressed downwardly to return to its initial position. That is, when the second handle 210 is rotated along the first direction D1, the cylindrical element 220 can be driven to rotate along the first direction D1. At this time, the movable element 240 is guided by the guiding tracks 223 to move from the locked ends 225 to the unlocked ends 224, as shown in FIG. 12. In other words, the lock 10 in the first embodiment can be unlocked by using the key, pressing the second handle 210 downwardly or pulling the second handle 210 upwardly.

In the embodiment, when the lock 10 is switched between the locked state and the unlocked state, the transmission element 400 is incapable of axial movement, which is favorable for reducing the operation resistance and enhancing the operation smoothness. Furthermore, with the improvement of the structure of the transmission mechanism of the lock 10, such as the omission of the transmission cam, the assembly error similar to that of the conventional lock 1 can be avoided.

The Second Embodiment

Figure 14:
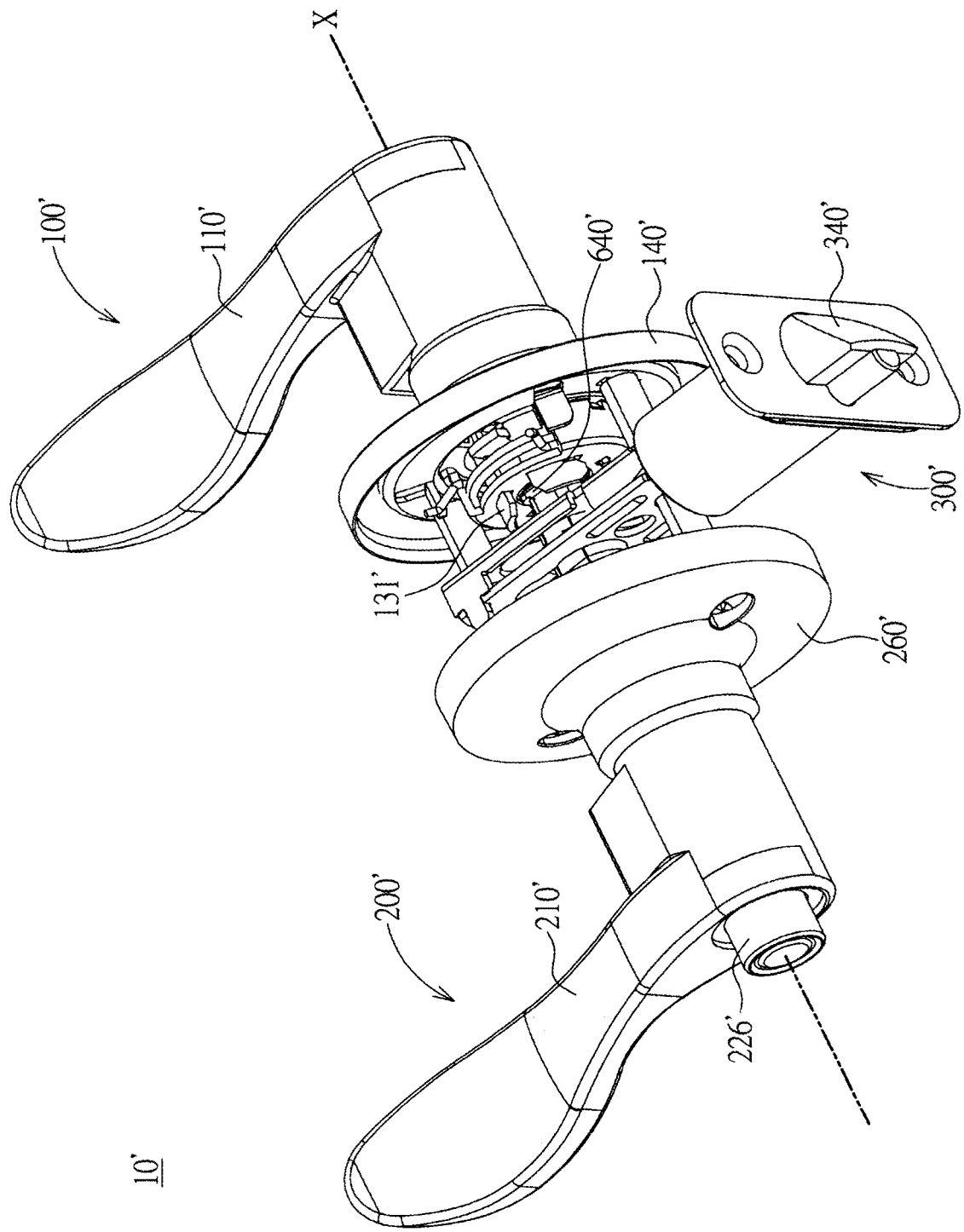
FIG. 14 is a three-dimensional diagram showing a lock according to a second embodiment of the present disclosure.
Figure 15:
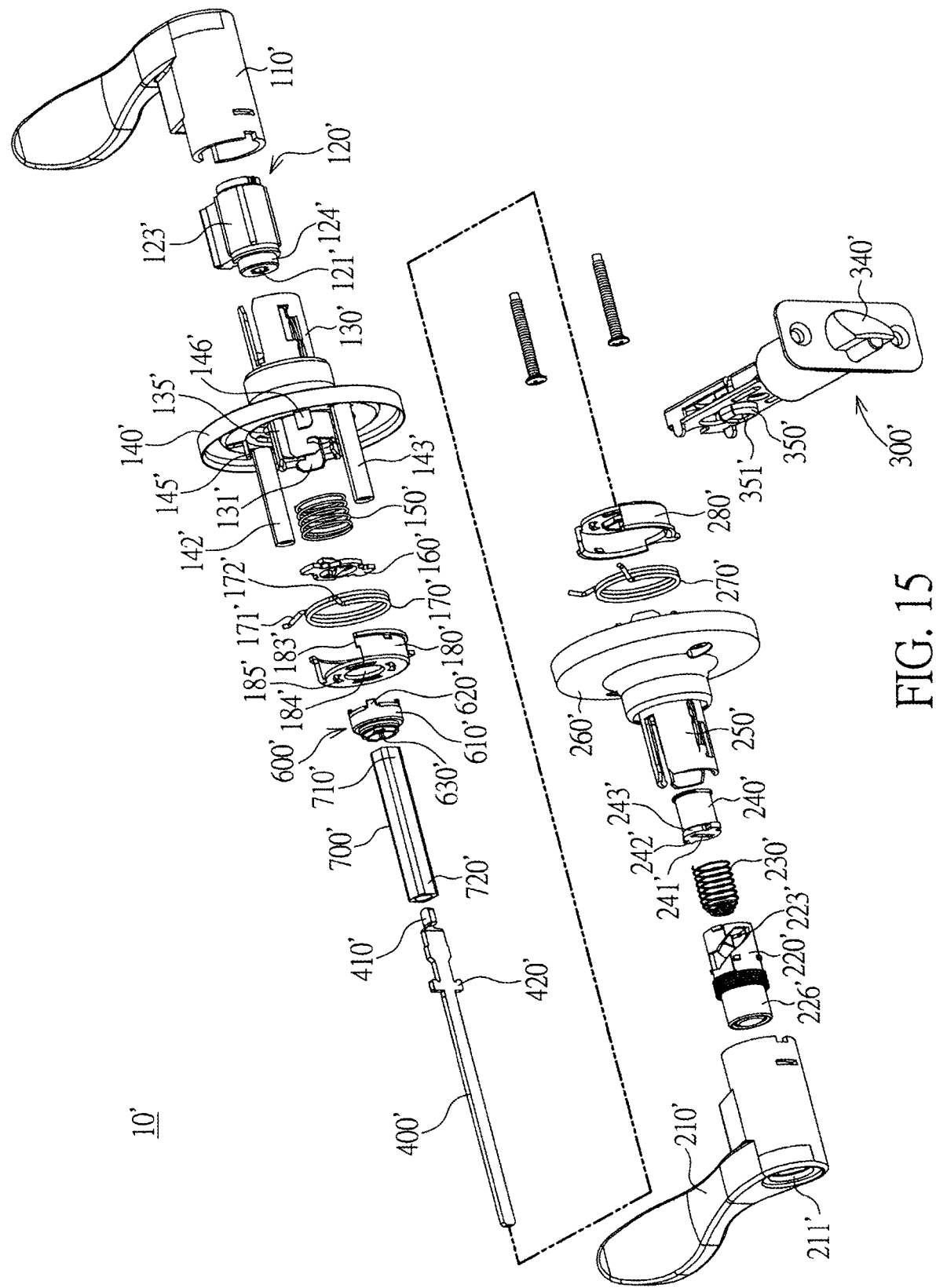
FIG. 15 is an exploded diagram showing the lock of FIG. 14.
Figure 16:
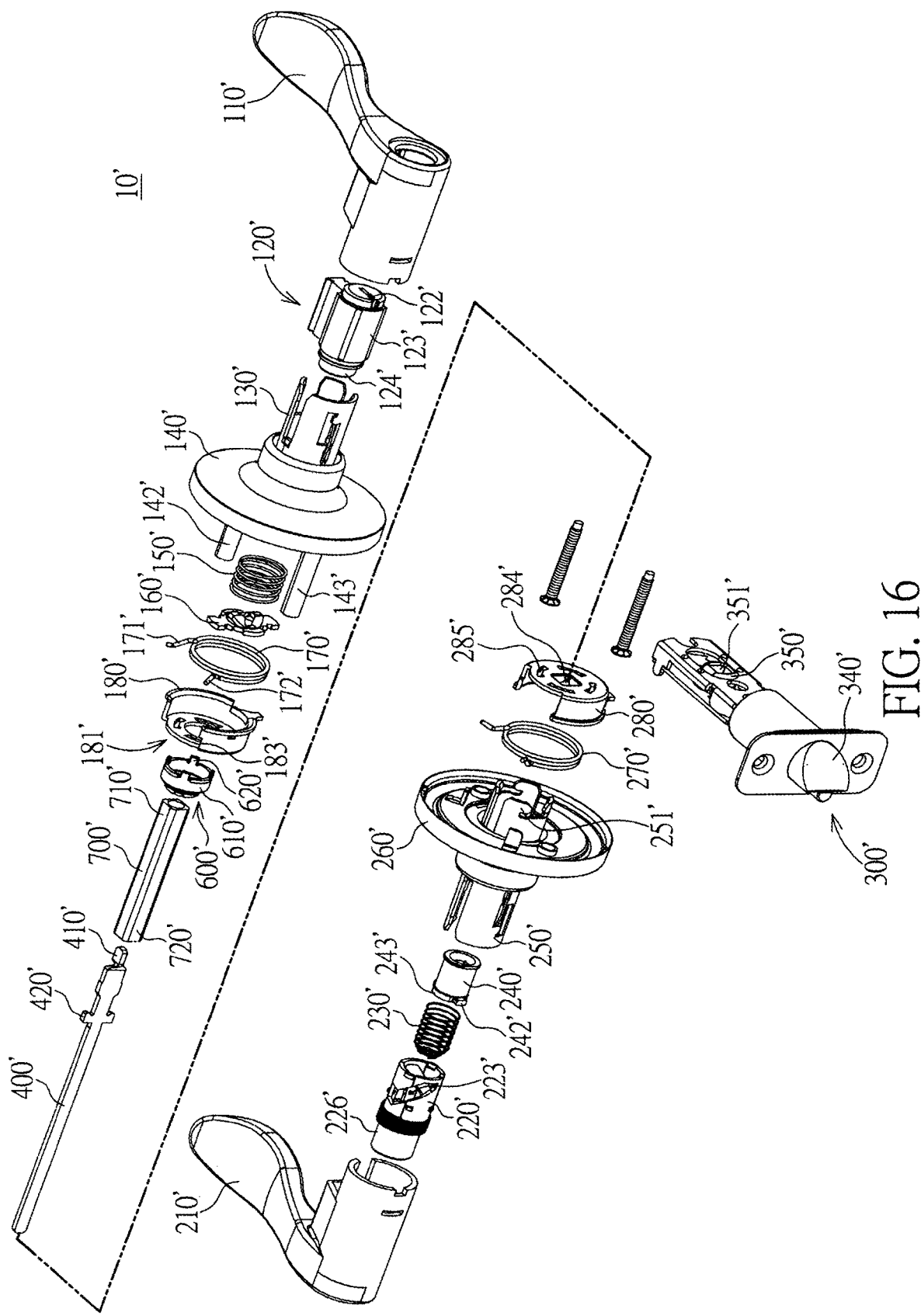
FIG. 16 is another exploded diagram showing the lock of FIG. 14.

Please refer to FIG. 14 to FIG. 16, another transmission mechanism (not labelled) applied to a lock 10' and for controlling the lock 10' to switch between an unlocked state and a locked state is disclosed. The lock 10' defines a rotating axis X and is for being installed on a door (not shown). The door includes a first side and a second side opposite to the first side. The lock 10' includes a first handle set 100' and a second handle set 200'. The first handle set 100' is disposed on the first side of the door, and the second handle set 200' is disposed on the second side of the door. The first handle set 100' includes a first cover plate 140' fixedly disposed on the first side of the door.

Figure 18:
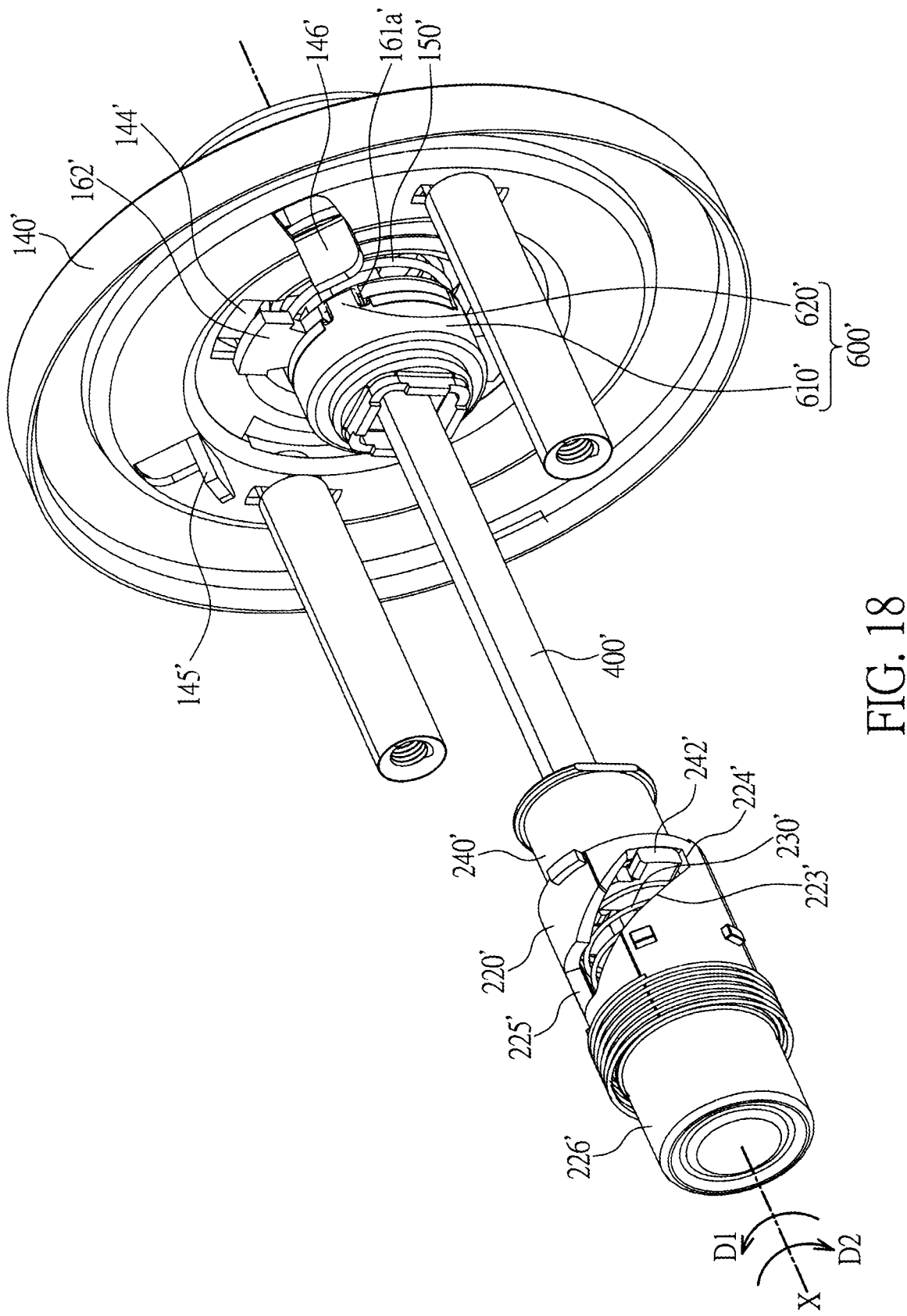
FIG. 18 is a schematic diagram showing a first cover plate and a transmission mechanism of FIG. 15 in an unlocked state.
Figure 19:
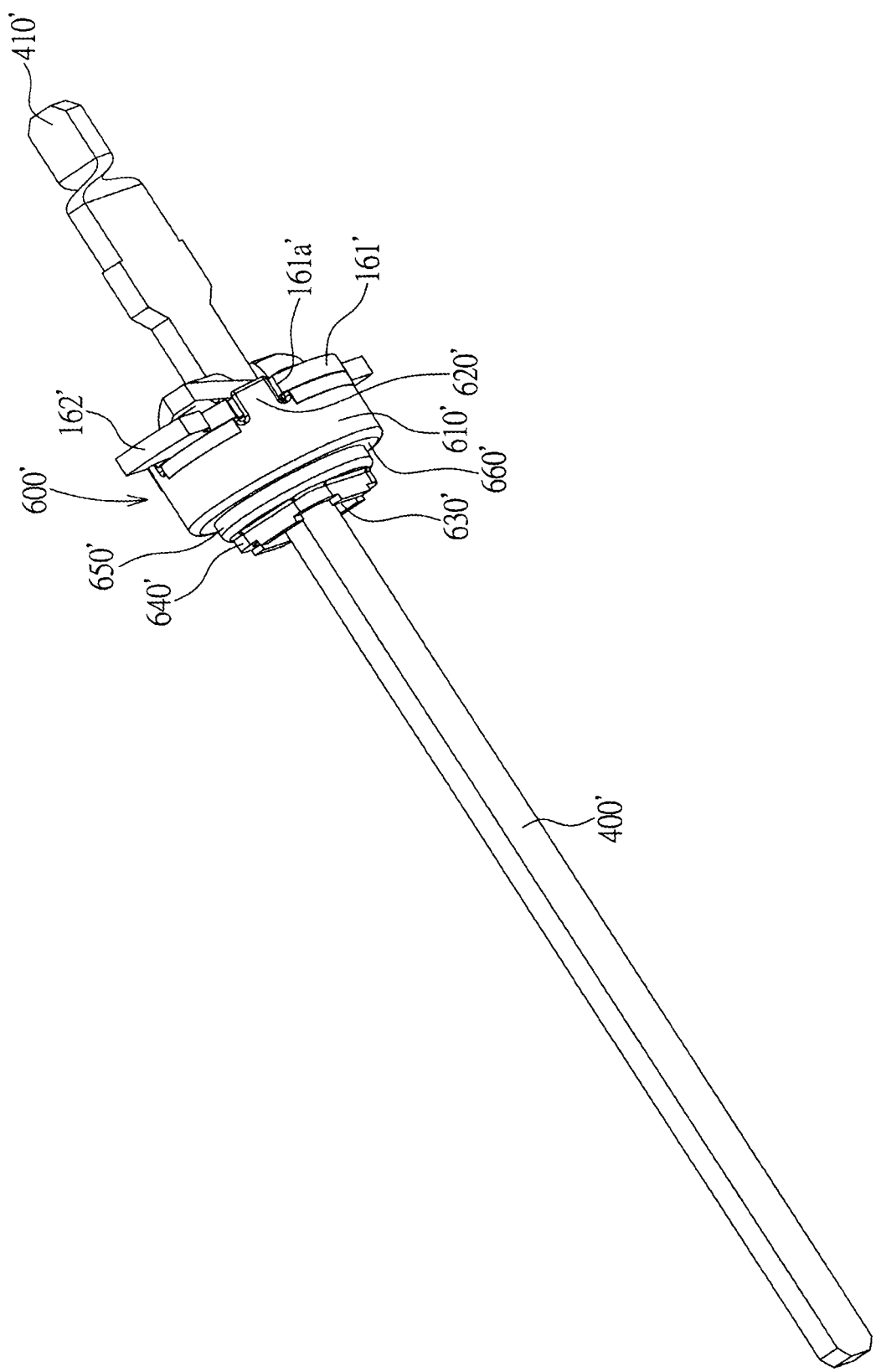
FIG. 19 is a schematic diagram showing a transmission element, the moving component and a transmission cam of FIG. 18 in an unlocked state.
Figure 20:
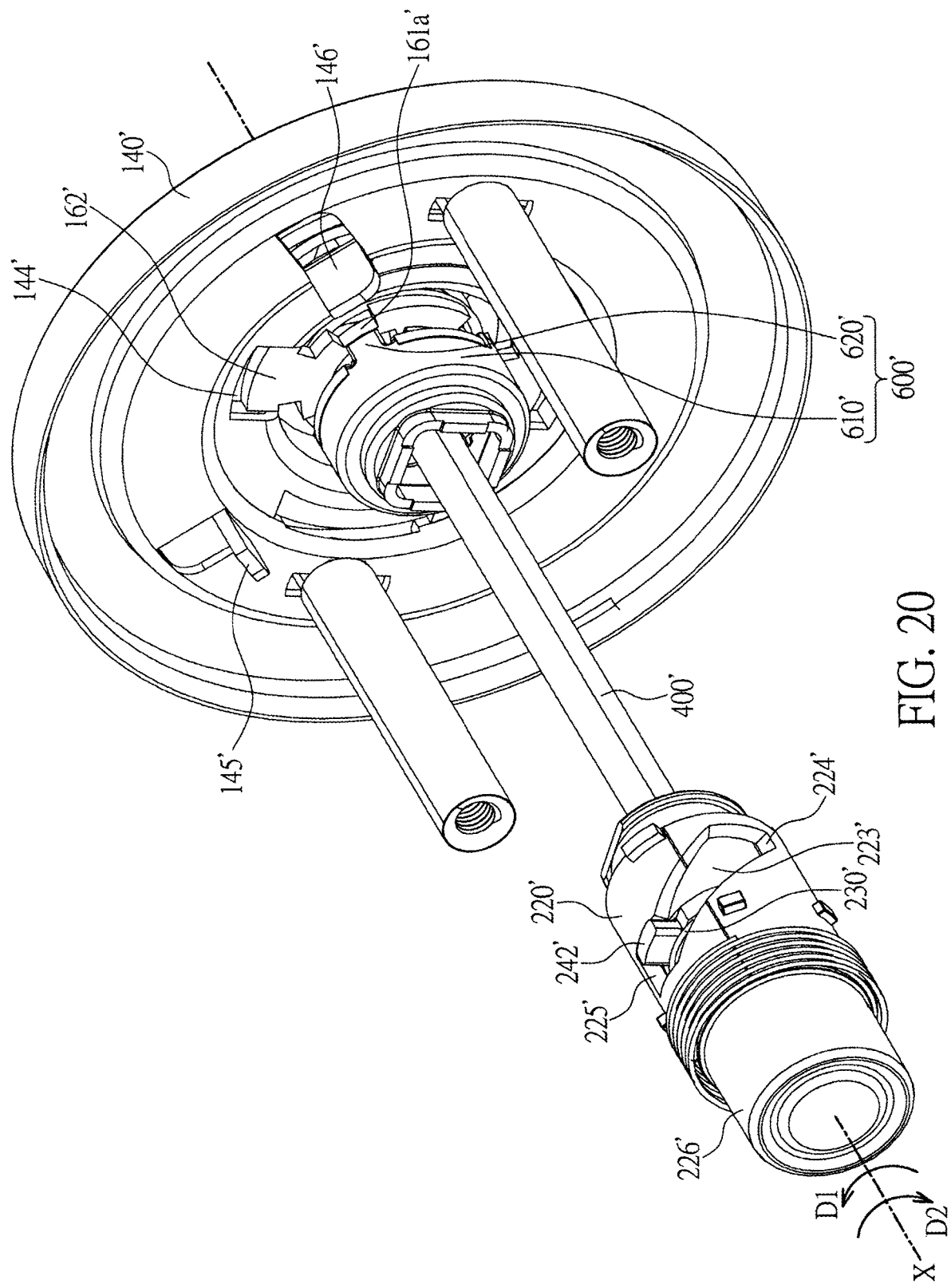
FIG. 20 is a schematic diagram showing the first cover plate and the transmission mechanism of FIG. 15 in a locked state.

Please refer to FIG. 18 to FIG. 20. The first cover plate 140' includes two first fitting portions 144' which are disposed symmetrically. The number of the first fitting portions 144' is exemplary. The transmission mechanism includes a transmission element 400' and a moving component 160'. The transmission element 400' is connected to the first handle set 100' in a manner that the transmission element 400' is incapable of moving along the rotating axis X. The transmission element 400' has two abutting portions 420' which are disposed symmetrically. The number of the abutting portions 420' is exemplary. The moving component 160' is disposed on the transmission element 400' in a manner that the moving component 160' is capable of moving along the rotating axis X.

Figure 17:
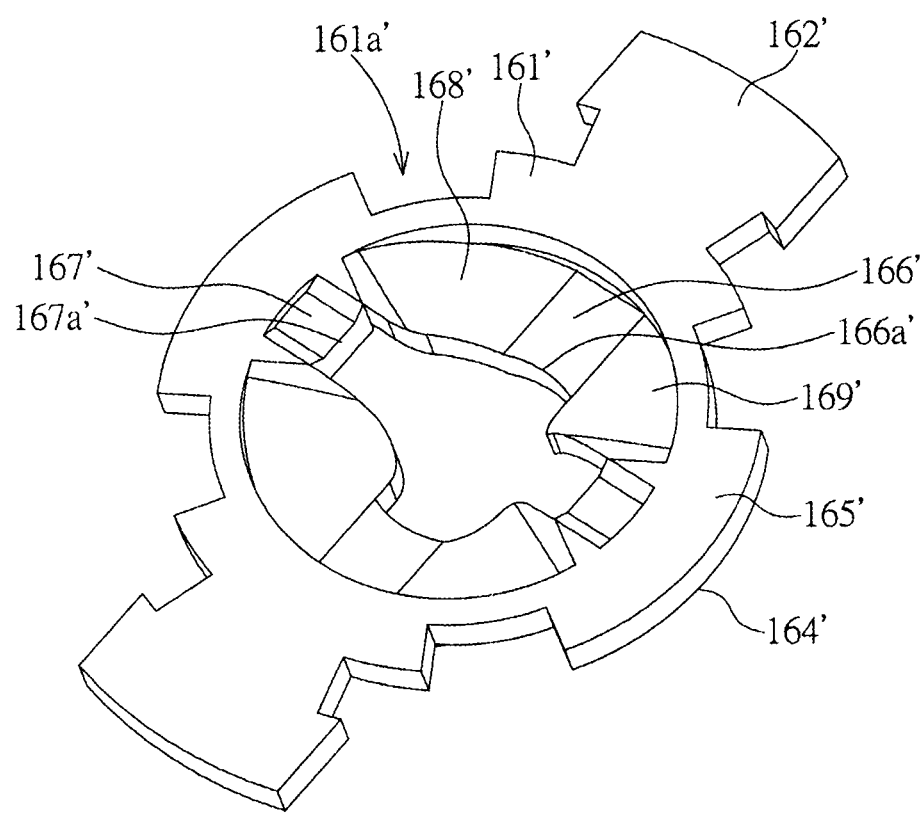
FIG. 17 is a three-dimensional diagram showing a moving component of FIG. 15.

Please refer to FIG. 17. The moving component 160' includes two first engaging grooves 166', two second engaging grooves 167' and two second fitting portions 162'. The numbers of the first engaging grooves 166', the second engaging grooves 167' and the second fitting portions 162' are exemplary. The two first engaging grooves 166' are disposed symmetrically. The two second engaging grooves 167' are disposed symmetrically. The two second fitting portions 162' are disposed symmetrically. The second fitting portions 162' are configured for corresponding to the first fitting portions 144'. When the transmission element 400' is operated to rotate, the abutting portions 420' are capable of switching between the first engaging grooves 166' and the second engaging grooves 167'. As shown in FIG. 18, when the abutting portions 420' are located in the first engaging grooves 166', the second fitting portions 162' are configured to be separated from the first fitting portions 144', such that the lock 10' is in the unlocked state. As shown in FIG. 20, when the abutting portions 420' are located in the second engaging grooves 167', the second fitting portions 162' are configured to be fitted into the first fitting portions 144', such that the lock 10' is in the locked state.

With the aforementioned structure, the transmission mechanism according to the present disclosure controls the lock 10' to switch between the unlocked state and the locked state by the movement of the moving component 160' along the rotating axis X, such that the second fitting portions 162' are capable of being separated from the first fitting portions 144' or being fitted into the first fitting portions 144'. The transmission element 400' only rotates about the rotating axis X and is incapable of moving along the rotating axis X (hereinafter, also called axial movement). Accordingly, the operation resistance can be reduced, and the operation smoothness can be enhanced.

As shown in FIG. 17, the moving component 160' has two sides 164', 165' opposite to each other. The first engaging grooves 166' and the second engaging grooves 167' are formed on the side 165' of the moving component 160'. The first engaging groove 166' has a first bottom $166a'$, the second engaging groove 167' has a second bottom $167a'$. A distance (not labelled) is between the first bottom $166a'$ and the second bottom $167a'$ along the rotating axis X. The moving component 160' can further include two guiding surfaces 168' and two stop surfaces 169'. Other details of the moving component 160' can refer to that of the moving component 160 of the first embodiment and are not repeated herein.

As shown in FIG. 15 and FIG. 16. The transmission mechanism can further include a first elastic element 150', a transmission cam 600', a tubular connecting element 700', a cylindrical element 220', a movable element 240' and a second elastic element 230'. Please also refer to FIG. 18 and FIG. 20. The cylindrical element 220' includes two guiding tracks 223'. Each of the guiding tracks 223' has an unlocked end 224' and a locked end 225'. The cylindrical element 220' can further include a button 226'. The button 226' is exposed to outside through a penetrating hole 211' (shown in FIG. 15) of the second handle 210'. The movable element 240' includes a main body 243', a limiting hole 241' and two guiding parts 242'. Other details of the movable element 240' can refer to that of the movable element 240 of the first embodiment. Differences between the second embodiment and the first embodiment are recited below.

As shown in FIG. 17, the moving component 160' can further include four first engaging parts 161a'. The number of the first engaging parts 161a' is exemplary. Each of the first engaging parts 161a' is a notch formed on a peripheral wall of the moving component 160'. Specifically, each of the first engaging parts 161a' is a notch concaved from the peripheral wall of the main body 161'.

As shown in FIG. 15 and FIG. 19, the transmission cam 600' includes a main body 610', four second engaging parts 620', a center hole 630', a first step portion 640' and a second step portion 650'. The number of the second engaging parts 620' is exemplary. The second engaging parts 620' are corresponding to the first engaging parts 161a' of the moving component 160'. Each of the second engaging parts 620' is a protrusion and is extended outwardly from a peripheral wall of the transmission cam 600' along the rotating axis X. More specifically, each of the second engaging parts 620' is a protrusion extended from a peripheral wall of the main body 610' along the rotating axis X and towards the first handle 110'. The second step portion 650' is extended from the main body 610' along the rotating axis X and towards the second handle 210'. The first step portion 640' is extended from the second step portion 650' along the rotating axis X and towards the second handle 210'. The second step portion 650' is configured to be surrounded by the center hole 184' of the first driving element 180', and the step surface 660' is configured to abut against a surface of the first driving element 180' facing towards the first handle 110'. As shown in FIG. 15, cross sections of the second step portion 650' and the center hole 184' of the first driving element 180' are circular. As such, the first driving element 180' is capable of rotating relative to the transmission cam 600'.

As shown in FIG. 15, the tubular connecting element 700' has a first end 710' and a second end 720' opposite to the first end 710'. The first end 710' of the tubular connecting element 700' is connected to the transmission cam 600' in a manner that the first end 710' of the tubular connecting element 700' and the transmission cam 600' are capable of moving synchronously. The second end 720' of the tubular connecting element 700' is connected to the second handle 210' of the second handle set 200' in a manner that the second end 720' of the tubular connecting element 700' and the second handle 210' are capable of moving synchronously. Specifically, the first end 710' of the tubular connecting element 700' is inserted in the center hole 630' of the transmission cam 600'. Cross sections of the tubular connecting element 700' and the center hole 630' are square, such that the tubular connecting element 700' is incapable of rotating relative to the transmission cam 600' and is connected to the transmission cam 600' in a manner that the tubular connecting element 700' and the transmission cam 600' are capable of moving synchronously. The second end 720' of the tubular connecting element 700' is inserted in the center hole 284' of the second driving element 280'. Cross sections of the tubular connecting element 700' and the center hole 284' are square, such that the tubular connecting element 700' is incapable of rotating relative to the second driving element 280' and is connected to the second driving element 280' in a manner that the tubular connecting element 700' and the second driving element 280' are capable of moving synchronously. The second driving element 280' is connected to the second handle 210' in a manner that the second driving element 280' and the second handle 210' are capable of moving synchronously (reference can be made to the related illustration of the first embodiment). Accordingly, the tubular connecting element 700' is connected to the second handle 210' in a manner that the tubular connecting element 700' and the second handle 210' are capable of moving synchronously.

The latch mechanism 300' is disposed between the first handle set 100' and the second handle set 200'. The latch mechanism 300' includes a latch tongue 340' and a transfer shaft 350'. The transfer shaft 350' penetrates the latch mechanism 300' and protrudes from two sides of the latch mechanism 300' along the rotating axis X. The tubular connecting element 700' is configured to drive the latch tongue 340' of the latch mechanism 300' to retract or stretch out. Specifically, the tubular connecting element 700' is inserted in the transfer hole 351' of the transfer shaft 350'. Cross sections of the tubular connecting element 700' and the transfer hole 351' are square, such that the tubular connecting element 700' is connected to the transfer shaft 350 in a manner that the tubular connecting element 700' and the transfer shaft 350 are capable of moving synchronously. When the tubular connecting element 700' is operated to rotate, the transfer shaft 350' is driven to rotate so as to drive the latch tongue 340' to retract or stretch out. How to drive the latch tongue 340' with the transfer shaft 350' is conventional and is omitted herein.

In the embodiment, cross sections of the center hole 284', the tubular connecting element 700' and the transfer hole 351' are square, such that the second driving element 280', the tubular connecting element 700', and the transfer shaft 350' are connected and are capable of moving synchronously with each other. However, the present disclosure is not limited thereto. In other embodiment, the cross sections of the center hole 284', the tubular connecting element 700', and the transfer hole 351' can be formed in other non-circular shapes, such as semicircular shapes, triangular shapes or pentagonal shapes, which can also achieve the same functionality.

In the embodiment, the first end 410' and the abutting portions 420' of the transmission element 400' are abutted by a bottom of a accommodating groove 121' of the lock element 120' and the first end 710' of the tubular connecting element 700', such that the transmission element 400' is incapable of axial movement.

Moreover, in the embodiment, the first handle 110', the lock element 120', the first axial tube 130', the moving component 160', the first driving element 180' are connected and capable of moving synchronously with each other, i.e., capable of rotating with each other. The first axial tube 130' has four hooks 131' engaged with four hook slots 185' of the first driving element 180', such that the first axial tube 130' is connected to the first driving element 180' in a manner that the first axial tube 130' and the first driving element 180' are capable of moving synchronously. The two second fitting portions 162' of the moving component 160' protrude from the two limiting groove 135' (shown in FIG. 15) of the first axial tube 130', respectively. As such, the moving component 160' is incapable of rotating relative to the first axial tube 130' and is connected to the first axial tube 130' in a manner that the moving component 160' and the first axial tube 130' are capable of moving synchronously. The transmission element 400' is connected to the lock element 120' in a manner that the transmission element 400' and the lock element 120' are capable of moving synchronously. When the lock cylinder 124' is operated to rotate relative to the outer cylinder 123', the transmission element 400' can be driven to rotate therewith. The second handle set 200' includes a second handle 210', a second axial tube 250', a second cover plate 260', a second restoring element 270' and a second driving element 280'. The second handle 210', the cylindrical element 220', the second axial tube 250', the second driving element 280', the tubular connecting element 700' and the transfer shaft 350' are connected and capable of moving synchronously with each other. The second axial tube 250' has four hooks 251' engaged with four hook slots 285' of the second driving element 280', such that the second axial tube 250' is connected to the second driving element 280' in a manner that the second axial tube 250' and the second driving element 280' are capable of moving synchronously, i.e., capable of rotating together. Other details can refer to the related illustration of the first embodiment.

Please refer to FIG. 17 to FIG. 19. FIG. 18 is a schematic diagram showing the first cover plate 140' and a transmission mechanism of FIG. 15 in the unlocked state. The tubular connecting element 700' is omitted for showing the direction of the transmission element 400'. When the lock 10' is in the unlocked state, the abutting portions 420' are in the first engaging grooves 166', the second fitting portions 162' are separated from the first fitting portions 144', and the first engaging parts 161a' of the moving component 160' are engaged with the second engaging parts 620' of the transmission cam 600'. Because the second fitting portions 162' are not fitted into the first fitting portions 144', the moving component 160' is capable of rotating relative to the first cover plate 140'. Because the moving component 160' is connected to the first handle 110' in a manner that the moving component 160' and the first handle 110' are capable of moving synchronously, the first handle 110' is also capable of rotating relative to the first cover plate 140'. Moreover, because the first engaging parts 161a' of the moving component 160' are engaged with the second engaging parts 620' of the transmission cam 600', the first handle 110' is connected to the transmission cam 600' in a manner that the first handle 110' and the transmission cam 600' are capable of moving synchronously. When the first handle 110' is pressed downwardly, i.e., the first handle 110' is rotated along the first direction D1, the first driving element 180', the moving component 160', the transmission cam 600' and the tubular connecting element 700' are driven to rotate along the first direction D1, which drives the transfer shaft 350' to rotate along the first direction D1 to drive the latch tongue 340' to retract to open the door. When the first handle 110' is released, the first restoring element 170' provides the elastic force for the first driving element 180' to rotate along the second direction D2 to return to its initial position, which drives the first handle 110', the moving component 160', the transmission cam 600' and the tubular connecting element 700' to rotate along the second direction D2, such that the transfer shaft 350' is driven to rotate along the second direction D2 to drive the latch tongue 340' to stretch out to its initial position. As shown in FIG. 15, the first restoring element 170' is through a first leg 171' and a second leg 172' cooperated with the first limiting post 145' and the second limiting post 146' of the first cover plate 140', and an end 183' of the limiting slot 181' of the first driving element 180' to bring the first driving element 180' to return its initial position. Details can refer to the related illustration of the first embodiment and are not repeated herein. When the second handle 210' is pressed downwardly, the latch tongue 340' can be driven to retract to open the door; when the second handle 210' is released, the latch tongue 340' can be driven to stretch out to its initial position. The principle that drives the latch tongue 340' through the second handle 210' is similar to that of the first handle 110 and the second handle 210 of the first embodiment, and is not repeated herein.

Figure 21:
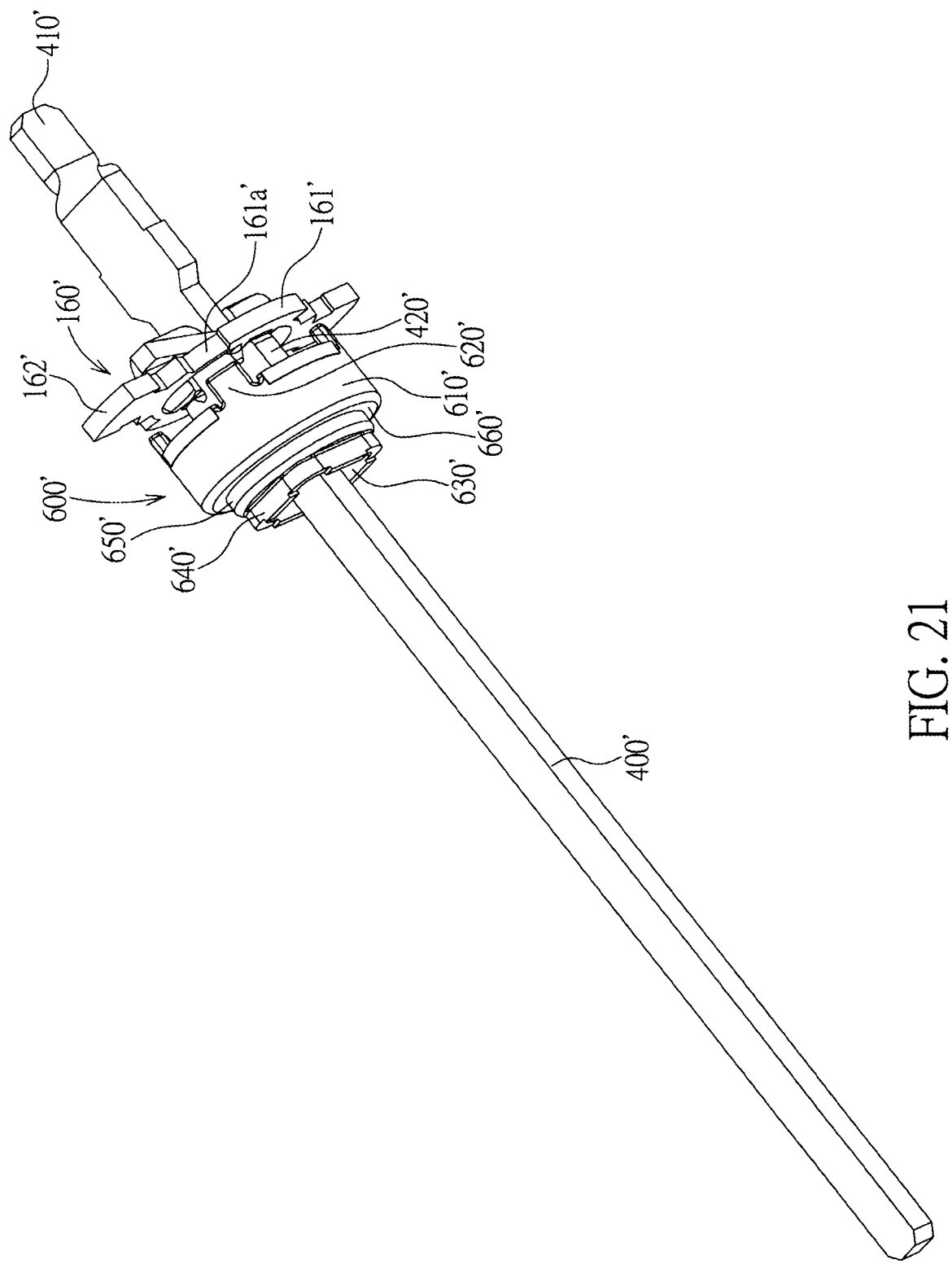
FIG. 21 is a schematic diagram showing the transmission element, the moving component and the transmission cam of FIG. 20 in a locked state.

Please refer to FIGS. 17, 20 and 21. FIG. 20 is a schematic diagram showing the first cover plate 140' and the transmission mechanism of FIG. 15 in the locked state. The tubular connecting element 700' is omitted for showing the direction of the transmission element 400'. When the lock 10' is in the locked state, the abutting portions 420' are in the second engaging grooves 167', the second fitting portions 162' are engaged with the first fitting portions 144', and the first engaging parts 161a' of the moving component 160' are separated from the second engaging parts 620' of the transmission cam 600'. Because the second fitting portions 162' are fitted into the first fitting portions 144', the moving component 160' is incapable of rotating relative to the first cover plate 140'. Because the moving component 160' is connected to the first handle 110' in a manner that the moving component 160' and the first handle 110' are capable of moving synchronously, the first handle 110' is incapable of rotating relative to the first cover plate 140', either. Accordingly, the first handle 110' is incapable of driving the latch tongue 340' to retract to open the door. Moreover, when the lock 10' in the locked state, the first engaging parts 161a' of the moving component 160' are separated from the second engaging parts 620' of the transmission cam 600', the first handle 110' is independent from the transmission cam 600' and the tubular connecting element 700'. As such, the second handle 210' is capable of rotating relative to the second cover plate 260', even though the first handle 110' is incapable of rotating relative to the first cover plate 140'. Accordingly, the transmission cam 600' and the tubular connecting element 700' are capable of being driven to rotate by the second handle 210'.

When the lock 10' is in the unlocked state, the lock 10' can be switched to the locked state by the following methods. In the first method, a key (not shown) is inserted into the keyhole 122' (shown in FIG. 16) of the lock element 120' and rotated, which allows the lock cylinder 124' to rotate relative to the outer cylinder 123' along the first direction D1, and the transmission element 400' is driven to rotate along the first direction D1, such that the lock 10' is in the locked state, as shown in FIG. 20. In the second method, as shown in FIG. 18, the button 226' is pressed, which allows the cylindrical element 220' to be operated to move along the rotating axis X and towards the first handle set 100', the guiding parts 242' of the movable element 240' are guided by the guiding tracks 223' to move from the unlocked ends 224' to the locked ends 225' to drive the transmission element 400' to rotate along the first direction D1, such that the lock 10' is in the locked state.

When the lock 10' is in the locked state, the lock 10' can be switched to the unlocked state by the following methods. In the first method, the key (not shown) is inserted into the keyhole 122' (shown in FIG. 16) of the lock element 120' and rotated, which drives the lock cylinder 124' to rotate relative to the outer cylinder 123' along the second direction D2, and the transmission element 400' is driven to rotate along the second direction D2, such that the lock 10' is in the unlocked state, as shown in FIG. 18. In the second method, the second handle 210' is pressed downwardly (i.e., the second handle 210' is rotated along the first direction D1) to drive the cylindrical element 220' to rotate along the first direction D1. The second elastic element 230' releases the elastic force. The guiding parts 242' of the movable element 240' move from the locked ends 225' to the unlocked ends 224' by the push of the second elastic element 230' and the guidance of the guiding tracks 223'. The transmission element 400' is driven to rotate along the second direction D2, such that the lock 10' is in the unlocked state. In the third method, the second handle 210' is pulled upwardly, i.e., the second handle 210' is rotated along the second direction D2 to drive the cylindrical element 220' to rotate along the second direction D2. The locked ends 225' of the guiding tracks 223' push the guiding parts 242' of the movable element 240' to drive the movable element 240' and the cylindrical element 220' to rotate along the second direction D2, and the transmission element 400' is driven to rotate along the second direction D2, such that the abutting portions 420' are moved from the second engaging grooves 167' to the first engaging grooves 166', so as to allow the second fitting portions 162' to separate from the first fitting portions 144', and the first engaging parts 161a' of the moving component 160' are engaged with the second engaging parts 620' of the transmission cam 600'. Afterwards, the second handle 210' can be pressed downwardly to return to its initial position. That is, when the second handle 210' is rotated along the first direction D1, the cylindrical element 220' can be driven to rotate along the first direction D1. At this time, the movable element 240' is guided by the guiding tracks 223' to move from the locked ends 225' to the unlocked ends 224', as shown in FIG. 18. In other words, the lock 10' can be unlocked by using the key, pressing the second handle 210' downwardly or pulling the second handle 210' upwardly.

As shown in FIGS. 15, 16, 19 and 21, a cross section of the tubular connecting element 700' is a regular polygon, the moving component 160' includes a plurality of first engaging parts 161a', and the transmission cam 600' includes a plurality of second engaging parts 620'. A number of the first engaging parts 161a' and a number of the second engaging parts 620' are corresponding a number of the sides of the regular polygon, and the first engaging parts 161a' and the second engaging parts 620' are arranged equiangularly. Specifically, the cross section of the tubular connecting element 700' is a square, the number of the first engaging parts 161a' is four, and the number of the second engaging parts 620' is four. The four first engaging parts 161a' are arranged equiangularly. That is, an included angle formed by the connections between the two adjacent first engaging parts 161a' and the rotating axis X is 90 degrees. The four second engaging parts 620' are arranged equiangularly. That is, an included angle formed by the connections between the two adjacent second engaging parts 620' and the rotating axis X is 90 degrees. When assembling the lock 10', the latch mechanism 300' is installed on the door first, then the first handle set 100' and the first elastic element 150', the moving component 160', the transmission cam 600', the tubular connecting element 700' and the transmission element 400' of the transmission mechanism are assembled to form an outer side assembly. The outer side assembly is disposed on the first side of the door, the tubular connecting element 700' and the transmission element 400' are inserted through the transfer hole 351', and the screw posts 142' and 143' are inserted through holes of the latch mechanism 300' correspondingly thereto, and are aligned and connected with the second handle set 200'. If the outer side assembly is in the locked state shown in FIG. 21 before assembling with the latch mechanism 300', the transmission cam 600' and the tubular connecting element 700' are capable of the idling rotating 360 degrees relative to the moving component 160' because the second engaging parts 620' are separated from the first engaging parts 161a'. Moreover, the number of the first engaging parts 161a' and the number of the second engaging parts 620' are corresponding to the number of the sides of cross section of the tubular connecting element 700'. When the tubular connecting element 700' is inserted through the transfer hole 351' in arbitrary direction, one of the second engaging parts 620' is corresponding to one of the first engaging parts 161a'. That is, the assembly error can be avoided. In other embodiment, the cross section of the tubular connecting element 700' can be a regular polygon other than the square. For example, the cross section of the tubular connecting element 700' can be a triangle, and the number of the first engaging parts 161a' and the second engaging parts 620' can be correspondingly adjusted to three and are arranged equiangularly, the same functionality can be achieved, too.

For other elements of the lock 10', references can be made to the elements having the same name of the lock 10. For other details of the lock 10', references can be made to the related illustration of the lock 10, and are not repeated herein.

In the embodiment, when the lock 10' according to the present embodiment is switched between the locked state and the unlocked state, the transmission element 400' is incapable of axial movement, which is favorable for reducing the operation resistance and enhancing the operation smoothness. Furthermore, with the improvement of the structure of the transmission mechanism of the lock 10', such as the omission the sliding slope on the transmission cam 600', the regular polygon of the cross section of the tubular connecting element 700', the correspondence between the numbers of the first engaging parts 161a' and the second engaging parts 620' and the sides of the regular polygon, and the equiangular arrangement of the first engaging parts 161a' and the second engaging parts 620', the assembly error similar to that of the conventional lock 1 can be avoided.

Compared to the prior art, when the lock of the present disclosure is switched between the locked state and the unlocked state, the transmission element is incapable of axial movement, which is favorable for reducing the operation resistance and enhancing the operation smoothness. Furthermore, with the improvement of the structure of the transmission mechanism, the assembly error can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmission mechanism applied to a lock and for controlling the lock to switch between an unlocked state and a locked state, the lock defining a rotating axis and for being installed on a door, the door comprising a first side and a second side opposite to the first side, the lock comprising a first handle set and a second handle set, the first handle set being disposed on the first side of the door, the second handle set being disposed on the second side of the door, the first handle set comprising a first cover plate fixedly disposed on the first side of the door, the first cover plate comprising a first fitting portion, the transmission mechanism comprising:

- a transmission element connected to the first handle set in a manner that the transmission element is incapable of moving along the rotating axis, the transmission element having an abutting portion;
- a moving component disposed on the transmission element in a manner that the moving component is capable of moving along the rotating axis, the moving component comprising:
  - a first engaging groove formed on a side of the moving component;
  - a second engaging groove formed on the side of the moving component; and
  - a second fitting portion configured for corresponding to the first fitting portion;
- a cylindrical element disposed in the second handle set, the cylindrical element comprising a guiding track, the guiding track having an unlocked end and a locked end opposite to the unlocked end; and
- a movable element disposed in the cylindrical element in a manner that the movable element is capable of moving along the guiding track, the movable element being connected to the transmission element in a manner that the movable element and the transmission element are capable of moving synchronously;
- wherein when the transmission element is operated to rotate, the abutting portion is capable of switching between the first engaging groove and the second engaging groove;
- wherein when the abutting portion is located in the first engaging groove, the second fitting portion is configured to be separated from the first fitting portion, such that the lock is in the unlocked state;
- wherein when the abutting portion is located in the second engaging groove, the second fitting portion is configured to be fitted into the first fitting portion, such that the lock is in the locked state;
- wherein when the cylindrical element is operated to move along the rotating axis and towards the first handle set, the movable element is guided by the guiding track to move from the unlocked end to the locked end to drive the transmission element to rotate, such that the lock is switched from the unlocked state to the locked state.

2. The transmission mechanism of claim 1, wherein the movable element comprises:
- a main body;
- a limiting hole formed in the main body and being inserted with the transmission element; and
- a guiding part extended outwardly from the main body along a direction perpendicular to the rotating axis and movably disposed in the guiding track.

3. The transmission mechanism of claim 1, wherein when the movable element is located at the locked end, and the cylindrical element is operated to rotate along a first direction, the movable element is guided by the guiding track to move from the locked end to unlocked end to drive the transmission element to rotate, such that the lock is switched from the locked state to the unlocked state.

4. The transmission mechanism of claim 3, wherein when the movable element is located at the locked end, and the cylindrical element is operated to rotate along a second direction opposite to the first direction, the movable element is driven by the cylindrical element to rotate along the second direction to drive the transmission element to rotate, such that the lock is switched from the locked state to the unlocked state.

5. The transmission mechanism of claim 1, further comprising:
- a second elastic element disposed in the cylindrical element and abutting against a side of the movable element;
- wherein when the cylindrical element is operated to move along the rotating axis and towards the first handle set, and the movable element is guided by the guiding track to move from the unlocked end to the locked end, the second elastic element is pushed against by the movable element and accumulates an elastic force;
- wherein when the cylindrical element is operated to rotate along a first direction, the second elastic element releases the elastic force to push the movable element, such that the movable element is driven to move from the locked end to the unlocked end.

6. A transmission mechanism applied to a lock and for controlling the lock to switch between an unlocked state and a locked state, the lock defining a rotating axis and for being installed on a door, the door comprising a first side and a second side opposite to the first side, the lock comprising a first handle set and a second handle set, the first handle set being disposed on the first side of the door, the second handle set being disposed on the second side of the door, the first handle set comprising a first cover plate fixedly disposed on the first side of the door, the first cover plate comprising a first fitting portion, the transmission mechanism comprises:

- a transmission element connected to the first handle set in a manner that the transmission element is incapable of moving along the rotating axis, the transmission element having an abutting portion;
- a moving component disposed on the transmission element in a manner that the moving component is capable of moving along the rotating axis, the moving component comprising:
  - a first engaging groove formed on a side of the moving component;
  - a second engaging groove formed on the side of the moving component;
  - a second fitting portion configured for corresponding to the first fitting portion; and
  - a first engaging part;
- a transmission cam comprising a second engaging part corresponding to the first engaging part; and
- a tubular connecting element having a first end and a second end opposite to the first end, the first end of the tubular connecting element being connected to the transmission cam in a manner that the first end of the tubular connecting element and the transmission cam are capable of moving synchronously, the second end of the tubular connecting element being connected to a second handle of the second handle set in a manner that the second end of the tubular connecting element and the second handle are capable of moving synchronously;
- wherein when the transmission element is operated to rotate, the abutting portion is capable of switching between the first engaging groove and the second engaging groove;
- wherein when the abutting portion is located in the first engaging groove, the second fitting portion is configured to be separated from the first fitting portion, such that the lock is in the unlocked state, and the first engaging part is engaged with the second engaging part, such that a first handle of the first handle set is capable of driving the transmission cam to rotate;

wherein when the abutting portion is located in the second engaging groove, the second fitting portion is configured to be fitted into the first fitting portion, such that the lock is in the locked state, and the first engaging part is separated from the second engaging part, such that the first handle of the first handle set is incapable of driving the transmission cam to rotate.

7. The transmission mechanism of claim 6, wherein the first engaging part is a notch formed on a peripheral wall of the moving component, the second engaging part is a protrusion extended outwardly from a peripheral wall of the transmission cam along the rotating axis.

8. The transmission mechanism of claim 6, wherein a cross section of the tubular connecting element is a regular polygon, the moving component comprises a plurality of first engaging parts, the transmission cam comprises a plurality of second engaging parts, a number of the first engaging parts and a number of the second engaging parts are corresponding a number of sides of the regular polygon, and the first engaging parts and the second engaging parts are arranged equiangularly.

9. The transmission mechanism of claim 6, wherein the lock further comprises a latch mechanism disposed between the first handle set and the second handle set, and the tubular connecting element is configured for driving a latch tongue of the latch mechanism to retract or stretch out.

* * * * *